(12) United States Patent
Vion-Dury

(10) Patent No.: US 9,448,986 B2
(45) Date of Patent: Sep. 20, 2016

(54) METHOD AND SYSTEM FOR PROCESSING DOCUMENTS THROUGH DOCUMENT HISTORY ENCAPSULATION

(75) Inventor: Jean-Yves Vion-Dury, Biviers (FR)

(73) Assignee: XEROX CORPORATION, Norwalk, CT (US)

( * ) Notice: Subject to any disclaimer, the term of this patent is extended or adjusted under 35 U.S.C. 154(b) by 903 days.

(21) Appl. No.: 12/754,812

(22) Filed: Apr. 6, 2010

(65) Prior Publication Data

US 2011/0246869 A1    Oct. 6, 2011

(51) Int. Cl.
*G06F 17/22* (2006.01)

(52) U.S. Cl.
CPC ....... *G06F 17/2288* (2013.01); *G06F 17/2211* (2013.01); *G06F 17/2247* (2013.01)

(58) Field of Classification Search
None
See application file for complete search history.

(56) References Cited

U.S. PATENT DOCUMENTS

| | | | | |
|---|---|---|---|---|
| 7,454,745 | B2 * | 11/2008 | Aridor et al. | 717/122 |
| 2001/0049704 | A1 * | 12/2001 | Hamburg et al. | 707/530 |
| 2003/0149699 | A1 * | 8/2003 | Tsao | 707/100 |
| 2008/0077848 | A1 * | 3/2008 | Roberts | 715/229 |
| 2008/0172607 | A1 * | 7/2008 | Baer | 715/229 |

OTHER PUBLICATIONS

Kaizhong Zhang and Dennis Shasha, "Simple fast algorithms for editing distance between trees and related problems", Siam J. Comput, vol. 18, No. 6, pp. 1245-1262, Dec. 1989.

Philip Bille, "A survey on tree edit distance and related problems", DSSCV project supported by the IST Programme of the European Union (IST-2001-35443).

Sudarshan S. Chawathe, Anand Rajaraman, Hector Garcia-Molina, and Jennifer Widom, "Change detection in hierarchically structured information", research supported by the Air Force Wright Laboratory Aeronautical Systems Center under ARPA Contract F33615-93-1-1339, by the Air Force Rome Laboratories under ARPA Contrcat F30602-95-C-0119, and by equipment grants from Digital and IBM Corporations.

Hubert Comon, Max Dauchet, Remi Gilleron, Florent Jacquemard, Denis Lugiez, Christof Loding, Sophie Tison, and Marc Tommasi, Tree automata techniques and applications, TATA, Nov. 18, 2008.

Shu-Yao Chien, Vassilis J. Tsotras, and Carlo Zaniolo, A comparative study of version management schemes for xml documents, Sep. 6, 2000.

Gregory Cobena, Talel Abdessalem, and Yassine Hinnach, "A comparative study for xml change detection".

Robin La Fontaine, "Merging xml files: a new approach providing intelligent merge of xml data sets", presented at xml Europe 2002.

(Continued)

*Primary Examiner* — Keith Bloomquist
(74) *Attorney, Agent, or Firm* — Fay Sharpe LLP

(57) ABSTRACT

A computer-implemented system and method for processing a markup language document and its change history are provided. The method includes receiving first and second versions of the same target document into computer memory. One of the first and second versions of the target document is encapsulated within an encapsulating document. A change history corresponding to a difference between the first version and the second version of the target document is encoded. The change history is encapsulated within the encapsulating document. The encapsulated document can then be output. As each new version of the target document is created, the encapsulating document can be modified to reflect the changes, enabling prior versions of the target document which have been encapsulated to be extracted at any time.

17 Claims, 21 Drawing Sheets

(56) References Cited

OTHER PUBLICATIONS

Mercedes Martinez, Jean-Claude Derniame, Pablo De La Fuente, "A method for the dynamic generation of virtual versions of evolving documents", SAC 2002, Madrid, Spain.

Tancred Lindholm, Jaakko Kangasharju, Sasu Tarkoma, "Fast and simple xml tree differencing by sequence alignment", DocEng 2006, Oct. 10-13, Amsterdam, The Netherlands.

Sanjeev Khanna, Keshav Kumal, and Benjamin C. Pierce, "A formal investigation of Diff3".

Sebastian Ronnau, Christian Pauli, and Uwe M. Borghoff, "Merging changes in xml documents using reliable context fingerprints", DocEng 2008, Sep. 16-19, 2008, Sao Paulo, Brazil.

Sebastian Ronnau, Geraint Philipp, and Uwe M. Borghoff, "Efficient change control of xml documents", DocEng 2009, Sep. 16-18, 2009, Munich, Gemany.

Luis Arevalo Rosado, Antonio Polo Marquez, and Miryam Salas Sanchez, "A web-based version editor of xml documents", DocEng 2009, Sep. 16-18, 2009, Munich, Germany.

Mercedes Martinez, Jean-Claude Derniame, Pablo De La Fuente, "A method for the dynamic generation of virtual versions of evolving documents", 2002.

Sebastian Ronnau, Christian Pauli, and Uwe M. Borghoff, "Merging changes in xml documents using reliable context fingerprints", 2008.

Sanjeev Khanna, Keshav Kunal, and Benjamin C, Pierce, "A formal investigation of diff3", University of Pennslyvania, Yahoo.

Tancred Lindholm, Jaakko Kangasharju, and Sasu Tarkoma, "Fast and simple xml tree differencing by sequence alignment", 2006.

Gregory Cobena, Talel Abdessalem, and Yassine Hinnach, "A comparative study for xml change detection", Inria, France.

Robin La Fontaine, Monsell EDM Ltd., "Merging xml files: a new approach providing intelligent merge of xml data sets", XML Europe 2002.

Sudarshan S. Chawathe, Amand Rajaraman, Hector Garcia-Molina, and Jennifer Widom, "Change detection in hierarchically structured information", Research supported by the Air Force Wright System Center under ARPA Contract F33615-93-1-1339.

Shu-Yao Chien, Vassilis J. Tsotras, Carlo Zaniolo, "A comparative study of version management schemses for xml documents", Sep. 6, 2000.

Philip Bille, "A survey on tree edit distance and related problems", DSSCV project supported by the IST Programme of the European Union (ISTR-2001-35443).

Kaizhong Zhang and Dennis Shasha, "Simple fast algorithms for the editing distance between trees and related problems", 1989 Society for Industrial and Applied Mathematics.

Hubert Comon, Max Dauchet, Remi Gilleron, Florent Jacquemard, Denis Lugiez, Christof Loding, Sophie Tison, and Marc Tommasi, "Tree Automata Techniques and Applications", TATA, Nov. 18, 2008.

\* cited by examiner

TO FIG. 4B

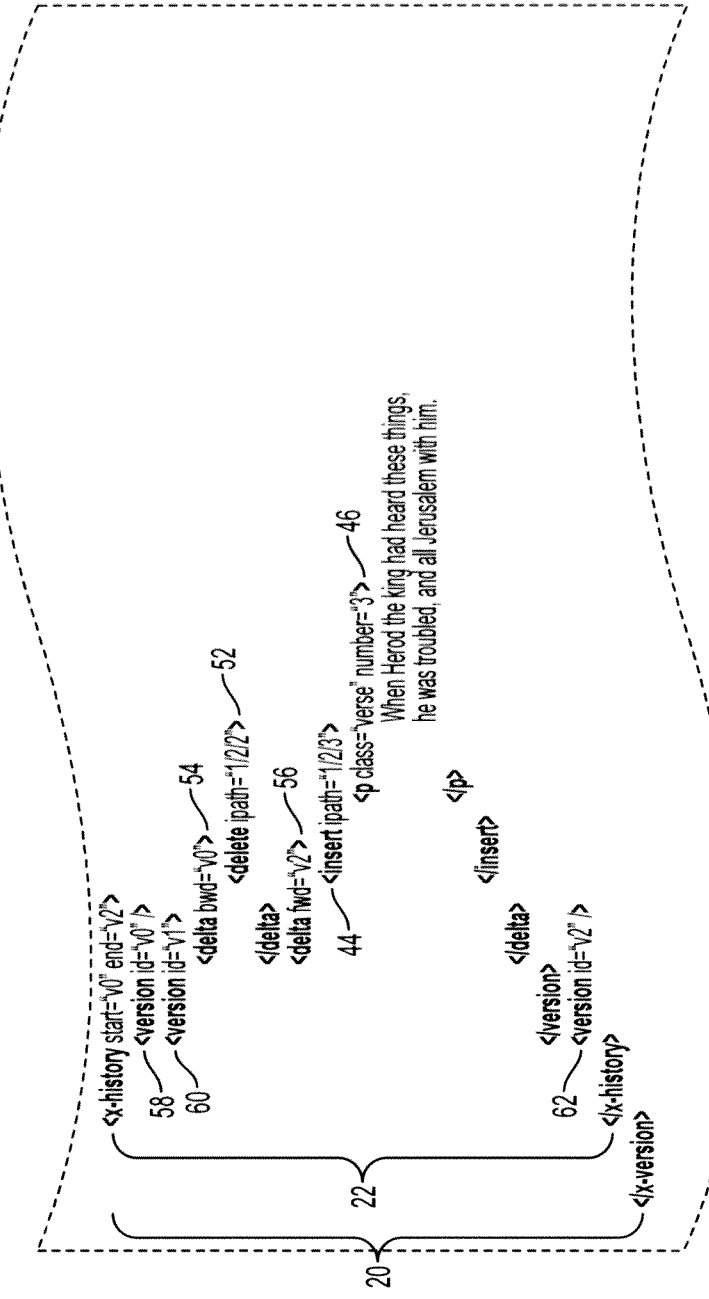

Encapsulating XML Document

```
<x-version id="xhtml-1.0" xmlns="XEROX::XRCE::DS:X-Version">
  <x-body version="v1">
    <html xmlns="http://www.w3.org/1999/xhtml">
    <!-- XHTML 1.0 -->
      <head>
        <title>New Testament (Matthew, chapter 2)</title>
      </head>
      <body>
        <p class="verse" number="1">
          Now when Jesus was born in Bethlehem of Judaea in the days of Herod the king,
          behold, there came wise men from the east to Jerusalem,
        </p>
        <p class="verse" number="2">
          Saying, Where is he that is born King of the Jews?
          For we have seen his star in the east, and are come to worship him.
        </p>
      </body>
    </html>
  </x-body>
  <x-history start="v0" end="v2"> —— 66
    <version id="v0">
      <delta fwd="v1">
```

FROM FIG. 5A

```
<insert ipath="1/2/2">
    <p class="verse" number="2">       ──74
    Saying, Where is he that is born King of the Jews?
    For we have seen his star in the east, and are come to worship him.
    </p>
</insert>
            </delta>
        <version id="V1">      ──68
        <delta fwd="V2">
<insert ipath="1/2/3">
    <p class="verse" number="3">
    When Herod the king had heard these things, he was troubled, and all Jerusalem with him.
    </p>
</insert>
            </delta>
        </version>
        <version id="V2"/>      ──70
    </x-history>
</x-version>
```

FIG. 5B

Encapsulating XML Document

```
<x-version id="xhtml-1.0" xmlns="XEROX::XRCE::DS:X-Version">
  <x-body version="v1">
    <html xmlns="http://www.w3c.org/1999/xhtml">
      <!-- XHTML 1.0 -->
      <head>
        <title>New Testament (Matthew, chapter 2)</title>
      </head>
      <body>
        <p class="verse" number="1">
          Now when Jesus was born in Bethlehem of Judaea in the days of Herod the king,
          behold, there came wise men from the east to Jerusalem,
        </p>
        <p class="verse" number="2">
          Saying, Where is he that is born King of the Jews?
          For we have seen his star in the east, and are come to worship him.
        </p>
      </body>
    </html>
  </x-body>
```

FROM FIG. 6A

```
<x-history start="v0" end="v2">
  <version id="v0">
    <delta fwd="v1">
      <insert ipath="1/2/2" copy="1/2/2"/>     —80
    </delta>
  <version id="v1">
    <delta fwd="v2">
      <insert ipath="1/2/3">
        <p class="verse" number="3">
          When Herod the king had heard these things, he was troubled, and all Jerusalem with him.
        </p>
      </insert>
    </delta>
  <version>
  <version id="v2" />
  </x-history>
</x-version>
```

METHOD AND SYSTEM FOR PROCESSING DOCUMENTS THROUGH DOCUMENT HISTORY ENCAPSULATION

BACKGROUND

The exemplary embodiment relates to a system and method for encoding and handling self-contained and incremental document history for documents encoded in a markup language such as Extensible Markup Language (XML).

XML is a widely used standard for encoding document information. For example, many word processing programs save documents in an XML format as a way of preserving the content and arrangement of the document. Additionally, XML documents (or XML files) may be passed between distinct software applications as a way of exchanging data in a universal format. These XML documents may change over time through the addition and deletion of information in the document. However, there is currently no universal way of keeping track of these changes within the document in a manner that allows any application or user to determine the history of changes in the document ("history"). Change history of an XML document may be useful for numerous reasons. Among other things, an application or user may wish to view a prior version of the document or merge a version of the document with another version of the same or a different document. Currently, such XML document management requires a content management system or database separate from the XML document itself. Models and operations pertaining to document change history are therefore hidden from view, and there exists no universal and reliable mechanism to allow for making this information manageable across diverse platforms. Additionally, many versioning systems are compatible and optimized only from the implementing application's point of view. Therefore, some basic universal functionality relating to the encoding and management of the incremental change history of an XML document within the XML document itself is of interest as XML documents become more prevalent within the user community.

BRIEF DESCRIPTION

In one aspect of the exemplary embodiment, a computer-implemented method for processing a markup language document is provided. The method includes receiving a first and second version of a target document into computer memory. Using a computer processor, either the first or second version of the target document is encapsulated within an encapsulating document. The method then encodes a change history corresponding to a difference between the first version and second version of the target document, and encapsulates the change history within the encapsulating document. The encapsulated document is output.

In another aspect, a storage medium containing, in a computer readable form, an encapsulating document is provided. The encapsulating document includes a version of a target document and an encoded change history corresponding to a difference between versions of the target document. The encoded change history includes at least one versioning point which includes a version difference expressed in a change description language.

In yet another aspect, a computer-based system for encoding a target document and its change history within an encapsulating document is provided. The system includes a computer processor and computer memory which stores an encapsulation module. The encapsulation module is configured to receive a first and a second version of a target document in computer memory and, using the computer processor, encapsulate one of the first and second versions of the target document within an encapsulating document. The encapsulation module is further configured to encode a change history corresponding to a difference between the first version and second version of the target document, encapsulate the change history within the encapsulating document, and output the encapsulating document.

BRIEF DESCRIPTION OF THE DRAWINGS

FIG. 5 graphically illustrates an encapsulating XML document focused on an intermediate version with linear change history encoding;

FIG. 6 graphically illustrates the encapsulating XML document of FIG. 5 with a copy operation substituted for a redundant subtree;

DETAILED DESCRIPTION

Figure 1:
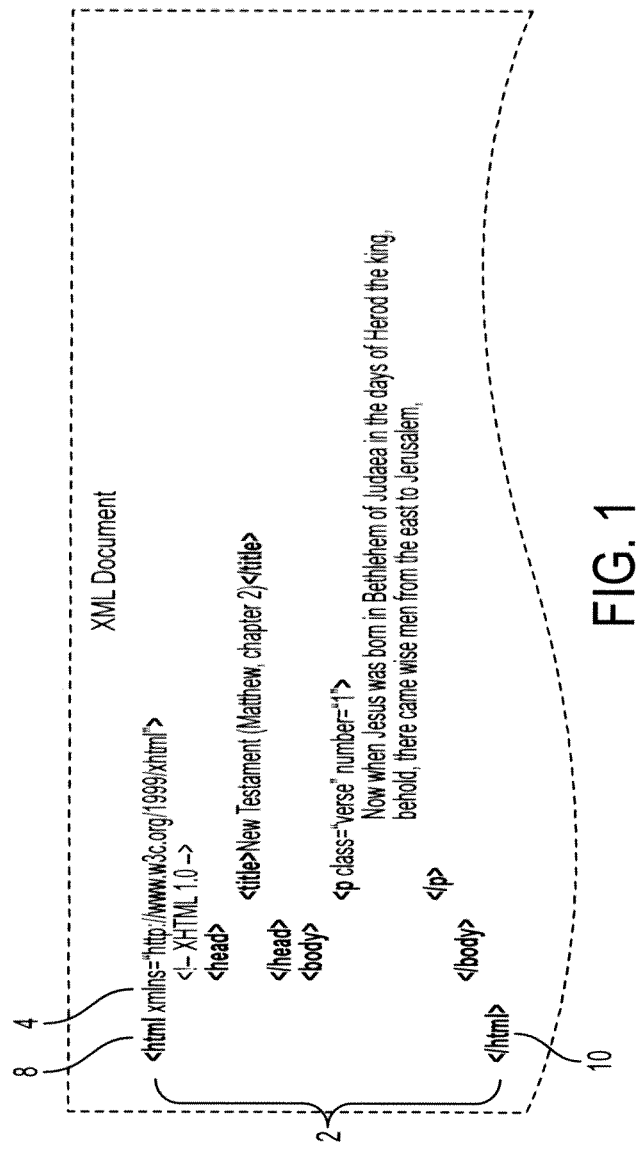
FIG. 1 graphically illustrates a first version of an input target XML document.

Disclosed herein are a system and method for encoding and managing self-contained and incremental document history for markup language documents, which are referred to herein for convenience as XML documents.

The exemplary method and system encapsulate together an XML document (target XML document) and its change history. A target XML document's change history contains descriptions of one or more significant states (versioning points) a document adopted during its existence. This change history is encapsulated as a section within a single standalone XML document along with a version of the target XML document itself. Moreover, the exemplary method and system focuses on the coherence of this change history information which allows for the processing of the encapsulated change history within the XML document and retrieval of prior or subsequent versions. For example, the exemplary method and system include a change history section within the standalone XML document suited to capture and encapsulate document versioning information and to allow for operations that enable basic usage of such encapsulated data. Specifically, the change history section describes a set of transformations between versioning points that allow for navigation within the history of the target XML document and consistent extraction of document versions. The change history section also allows for the creation of new versioning points and branches, as well as the merging of existing version branches. Each of the above operations produces novel and consistent encapsulations of a version of a target XML document and its change history within the encapsulating XML document.

Characteristics of the change history data model include the use of a universal XML data structure and related transformations that allow for the abstraction of the change history from the underlying storage system and execution model. These characteristics favor long term preservation of XML documents, infrastructure and vendor independence, and open the way to interoperable processing of XML versioning information.

The exemplary system and method utilize a particular namespace in order to embed a target XML document (which may itself use any syntax and vocabulary) without any change content and tag/attribute set of the target XML document. The document change history is encoded using a specific vocabulary that captures change operations in a formal and universal way such that an XML diff-enabled processor can generate differences between document versions (version differences). An XML diff-enabled processor ("diff engine") is any application or processor that computes differences between XML documents. The output from a diff engine is generally in the form of a change description language that describes, in a formalistic manner, the differences between any two documents. A "delta" (Δ), as used herein, is the difference between two document versions described in a change description language. Any of the several commercially or publicly available XML diff engines that can be adapted to generate formal and reliable deltas may be used in conjunction with the exemplary method and system.

With reference to FIG. 1, a target XML document 2 to be encapsulated is shown. The target XML document 2 may be any XML document using any XML namespace 4. The content of the target XML document 2 includes all content including and between the first opening tag 8 and the last closing tag 10.

Figure 2:
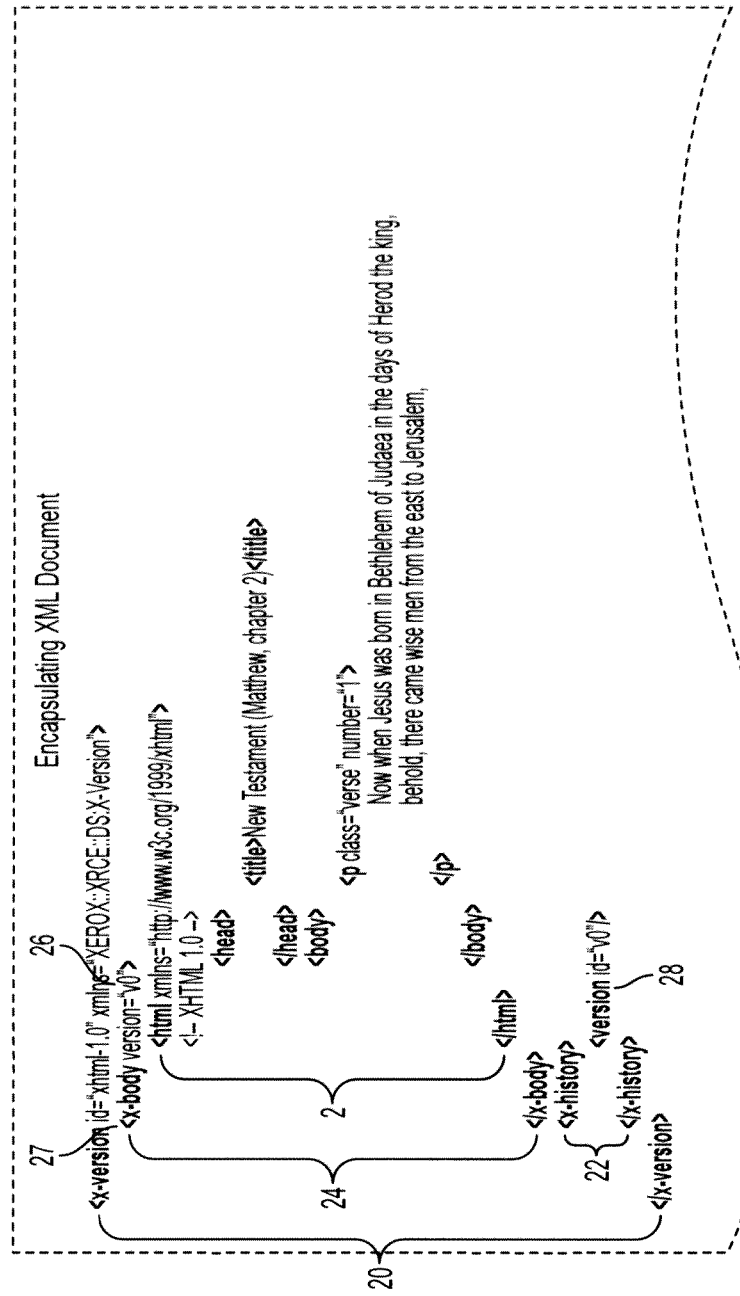
FIG. 2 graphically illustrates an encapsulating XML document containing the first version of the target XML document of FIG. 1 and an encoded change history.

FIG. 2 illustrates an encapsulating XML document 20 that encapsulates the target XML document 2 as well as the change history 22 of the target XML document 2. By "encapsulates," it is meant that the target XML document 2 and its change history form a single standalone XML document. The change history references one or more versioning points 28. Each versioning point 28 corresponds to a version of the same target XML document 2 which differs, in content, from that of an immediately prior or subsequent version. In the exemplary embodiment, the target XML document 2 is encapsulated within the body 24 of the encapsulating document 20. In alternate embodiments, the target XML document 2 may be encapsulated within any other part or section of the encapsulating document 20. The body 24 of the encapsulating document 20 includes an attribute 26 that gives a focused version (state) 27 embodied by the target XML document 2. The attribute 26 acts as a consistent link between the focused state of the target document 2 and a versioning point 28 in the change history 22. In the document illustrated by FIG. 2, the focused version 27 provided by attribute 26 is version 0 ("v0"). The body 24 is consistently and explicitly related to the version 27 in the change history 22 for the target XML document 2. The focused version 27 is not necessarily the most recent version for the document 2. For example, a change history 22 for a target XML document 2 may contain versioning points v0, v1, and v2. The focused version 27 for the document 2 may be v1, even though the latest versioning point 28 available in the change history 22 is v2. Version differences and versioning points thus represent changes between the document as it existed in the focused version 27 and corresponding prior or subsequent versions.

Data Model

The encapsulating XML document 20 is represented logically as a tree of interconnected nodes:

$$x\text{-version}[x\text{-body}_{vi}[d], x\text{-history}[v_0 \ldots v_i \ldots v_{n-1}]] \quad (1)$$

The x-body$_{vi}$ node contains a version $v_i$ of target XML document d, and the x-history node begins a subtree containing a change history that includes versioning points $v_0$ to $v_{n-1}$. The full syntax of the encapsulating document 20 may be provided through a RelaxNG Schema (see Appendices A and B for an example), or through other suitable markup language mechanism.

Figure 3:
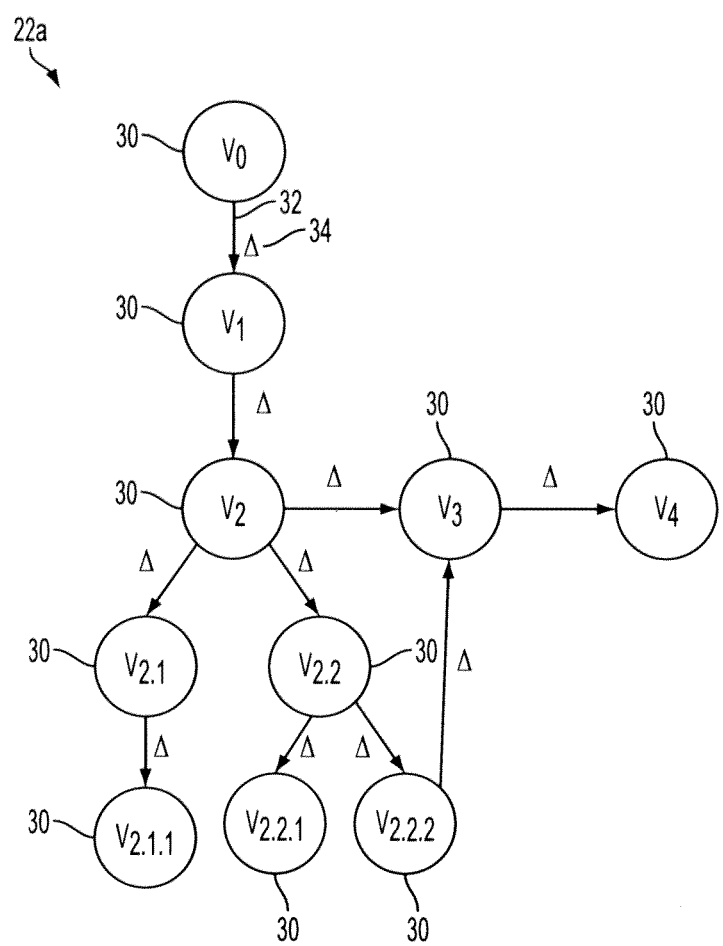
FIG. 3 is a directed graph logically illustrating the tree structure between the versioning points contained within a change history.

FIG. 3 illustrates the logical tree structure 22a for the change history 22 of a target XML document 2. FIG. 3 shows a directed acyclic graph 22a with interrelated nodes 30. Each node 30 in the graph 22a represents a distinct version of the target XML document 2 described in the change history 22 of the encapsulating XML document 20. That is to say, each node 30 of the graph 22a is a versioning point, i.e. a particular significant state that the target XML document 2 has reached during its lifetime which has been recorded as a version. The significance of any versioning point with respect to the document lifecycle may be application dependent. For instance, certain applications may determine that a given state of a target XML document is significant when an agent, at some point in the document lifecycle, decides that the given state is significant. Other applications may determine significant states based on the passage of time or other factors. Optionally, supplemental information may be attached to the versioning points, such as user meta-information, universal date/time of version creation, optimization data such as a hash-code or digest number.

With respect to the directed graph 22a of FIG. 3, arcs (edges) 32 that connect the nodes 30 represent version differences (deltas or Δ's) 34 that enumerate changes between the nodes (versioning points). Δ's 34 are combinations of basic operations (δ) on the target XML document tree, such as the deletion and/or insertion of subtrees. The combination of arcs 32 and version differences Δ's 34 model the transformations that occur from one versioning point 30 to another versioning point 30. Thus, the arcs 32 are oriented since they each pair one earlier versioning point with a later (in time) versioning point, differentiated by the corresponding version difference Δ 34. For example, in the exemplary tree illustrated, a first version $V_0$ of a target document is created by an author. This is is encapsulated together with its change history, which at this stage is empty, since there are no other versions encapsulated. Later, a second version $V_1$ of the same target document is encapsulated, which differs from the first version by a first set of changes (Δ), such as additions or deletions to the text content of the first version of the target document. Subsequently, a third version $V_2$ of the same target document is created by modifications to the second version and is encapsulated. Here, Δ represents the changes between $V_1$ and $V_2$. Thereafter, the target document is worked on by two different authors, each creating a new version denoted $V_{2.1}$ and $V_{2.2}$, respectively, which are encapsulated in the same encapsulating document (or in two separate encapsulating documents). The second author makes some further changes, resulting in $V_{2.2.2}$, which is encapsulated. Later, he decides to merge this version with $V_2$, which results in $V_3$, which is encapsulated in the encapsulation document. Further changes to this merged document result in $V_4$. All of these versions can be encapsulated in a single encapsulating document from which they can later be extracted, producing an output target document which is in the same form as it was at the time it was encapsulated.

Diff Engine

The exemplary system may utilize a diff engine that operates to formalize the changes between versions of a target document. The signature for the diff engine can be represented as:

$$\text{diff}(\text{config}, d, d') \rightarrow \Delta \quad (2)$$

where config is a set of parameters used to configure the diff engine (e.g., filter to apply, mode commutative/non-commutative, algorithm, etc), d is a first document, and d' is a second document. In the exemplary embodiment, d and d' are different versions of the same target XML document. The output of the diff engine (Δ) represents a set of basic operations (δ) described in a change description language. The basic operations 6 are selected from a predetermined set of basic operations available to the diff engine. The output has the following properties:

$$\Delta ::= \{\} | \quad (3)$$
$$\{\delta_1 \ldots \delta_i\} | \quad \text{commutative snapshots}$$
$$\Delta_1; \Delta_2 \quad \text{sequences}$$

$$\delta ::= \text{insert}(pp, A) | \text{insert-}attr(pp/@nm, A) | \quad (4)$$
$$\text{delete}(p).$$

δ denotes a basic operation that modifies an XML document. Examples of δ include the insert, insert-attr, and delete operations shown above, and are discussed in more detail below. A series of basic operations δ with commutative properties are denoted as a "commutative snapshot." A commutative snapshot is a series of basic operations δ performed on an XML tree (such as a version of the target XML document) that, when performed in any order, consistently produce the same resultant XML tree. As indicated above, Δ can represent a null (empty) set (i.e., no change between the versions), a commutative snapshot, or a sequence of commutative snapshots. It will be appreciated that, in general, not all versions have an empty set as the Δ.

The basic operations δ specify paths, denoted p or pp, to designate the tree location where the modification should be applied. The paths can be described by the following grammar:

$$p ::= pp | pp/@nm$$

$$pp ::= i/pp | i \quad (5)$$

where i is a positive integer and nm is an attribute name. The paths are interpreted relative to the root of the encapsulating document (i.e., the x-body element), and are easily translated to XPath expressions. XPath expressions are expressions formed in a query language that are used to select nodes from an XML document. For example, the path p 1/2/1 translates into the XPath expression *[1]/*[2]/*8 1], and path p 1/3/@id into *[1]/*[3]/@id. In these examples, the *[n] notation refers to a node level within a document and the @id notation refers to an element attribute. The basic operations listed above all require a path pp as an operand in order to perform their particular function. The insert and insert-attr operations additionally require a tree A as an operand. The tree A may be a single XML node such as a <p> (paragraph) node or a tree containing multiple nodes (such as a <p> element containing multiple <p> children). Specifically, the insert operation receives two parameters, a path pp and tree A, and inserts the tree A at location pp in the target XML document. The insert-attr operation performs in a manner similar to the insert operation, except that the tree A is inserted in the target XML document at the path designated by pp and the attribute value of nm. In order for the target XML document to be considered well-formed, the tree A must be a leaf within the target XML document. The delete operation simply deletes whatever tree is found at path pp.

In order to increase the generality of basic operations δ capable of being processed by the exemplary method and system, the following supplemental operations extend the existing basic operations δ through definitions based on the fundamental δ operations described above:

$$d > \{\text{move}(pp_1, pp_2)\} > d' <==>$$

$$d > \{\text{insert}(pp_2, \text{get}(d, pp_1))\text{delete}(pp_1)\} d' \quad (6)$$

$$d > \{\text{copy}(pp_1, pp_2)\} > d' <==>$$

$$d > \{\text{insert}(pp_2, \text{get}(d, pp_1))\} > d' \quad (7)$$

$$d > \{\text{replace}(pp_1, A)\} > d' <==>$$

$$d > \{\text{insert}(pp_1, A)\text{delete}(pp_1 \oplus \S pp_1)\} > d' \quad (8)$$

Thus, the move operation simply inserts the tree at path $pp_1$ at path $pp_2$ and deletes the tree at path $pp_1$. The copy operation inserts tree $pp_1$ at the path designated by $pp_2$, and the replace operation inserts tree A at path $pp_1$ and then deletes the tree previously at path $pp_1$ in original document d.

Figure 4A:
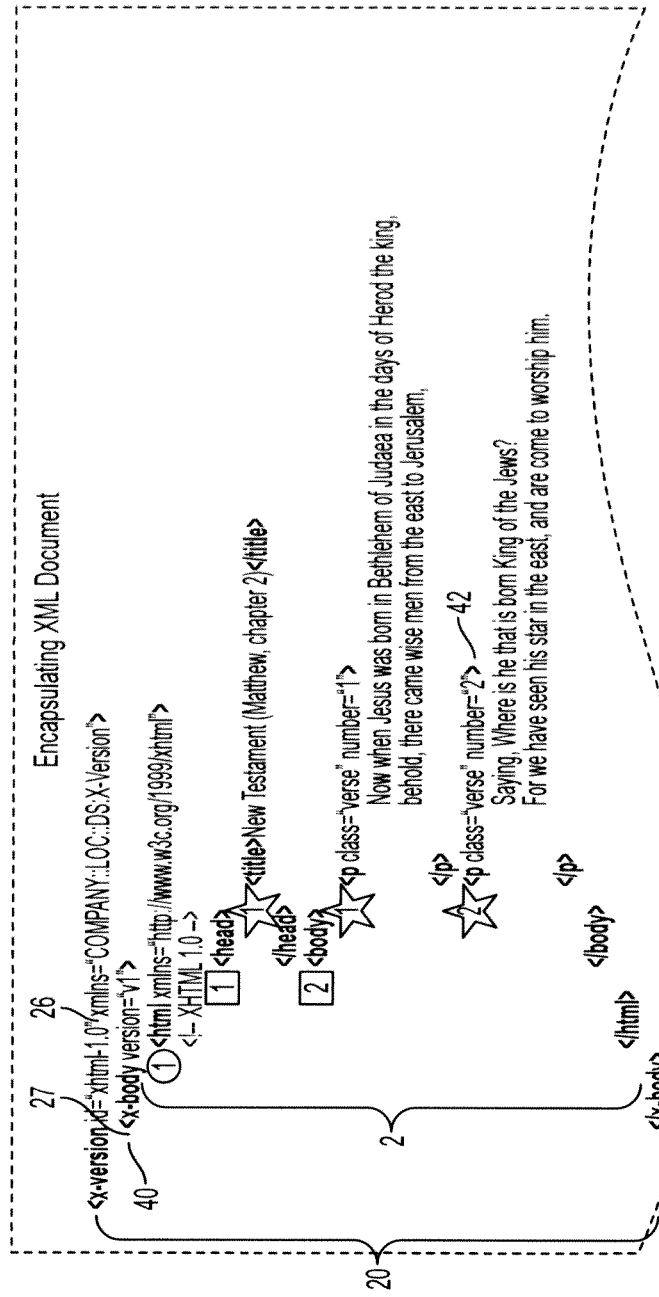
FIG. 4 graphically illustrates an encapsulating XML document containing a change history with multiple versioning points corresponding to multiple versions of the document.

FIG. 4 illustrates the path expressions (i.e., expressions of tree locations within an XML document) as applied by the exemplary method and system to an encapsulating document 20. In other words, paths provide location information to the basic operations so that the operations may be performed on the correct operands. The x-body element 40 is considered the root node for the purposes of path expressions since it is the innermost node that encapsulates the target XML document 2. Paths within the target XML document 2 are navigated with respect to the root node 40. Each number in the path denotes which child of the parent is chosen. Each child node becomes the parent for the next level in the path. In FIG. 4, the first node level down from the root node 40 is denoted, for illustration purposes, by a circle containing the respective child number. The second node level is denoted by squares containing child node numbers and the third node level is denoted by stars containing child node numbers. For example, the path "1/2/2" points to the <p> element 42 since the <p> element 42 is within the first child of the root node (i.e., the <html> element), second child of the <html> element (i.e., the <body> element) and the second child of the <body> element.

Encoding Version Changes (Deltas) in XML

FIG. 4 also illustrates the encoding of the insert and delete basic operations δ described above. Basic operations δ are encoded within version difference Δ elements 54, 56. For example, XML element 52 is an encoding of the delete basic operation and is contained within version difference (delta) element 54. In this case, the delete operation operand is the path "1/1/1" which means that the node located at path 1/1/1 will be deleted. In FIG. 4, the node that would be deleted is the <p> element 42. XML element 44 is an encoding of the insert operation (contained within delta element 56) which will insert the <p> element 46 at path "1/2/3". In FIG. 4, the <p> element 46 would be inserted after the <p> element 42.

The encapsulating document 20 shown in FIG. 4 contains three separate versioning points 58, 60 and 62, representing versions v0, v1 and v2 of target XML document 2, respectively. The encapsulating document 20 in FIG. 4 is "focused" on version v1 of the target XML document 2. The focused version 27 can be found in the x-body tag 40 of the encapsulating document 20. All target XML documents within encapsulating documents are focused on a single respective version. Focusing a target XML document refers to encoding the target XML document 2 within an encapsulating document 20 with respect to the focused version.

Versioning points 58, 60, 62 within an encapsulating document 20 are represented through the use of a dedicated XML element (e.g. <version>) associated with an id attribute that uniquely identifies the version. Each version element may contain from zero to multiple delta elements. In FIG. 4, version element 60 has an id attribute of "v1" and contains delta elements 54 and 56. This denotes that the deltas contained within version element 60 pertain to version 1 of the target XML document 2. Version elements 58 and 62 contain no delta elements. A naming scheme of the form "v0" . . . "v3" may be used to denote versions of the target XML document. Names for diverging branches use a dot, e.g. "v1.1", "v1.2". However, any version naming scheme may be implemented.

The delta elements 54, 56 capture the transition from the focused versioning point 27 to another versioning point. This information is conveyed by an attribute (e.g., "fwd" for forward links from an earlier version to a later version and "bwd" for backward links) contained in the version element 58, 60, 62. A forward link links a prior version to a later version, and a backward link links a later version to a prior version. As noted above, each Δ contains at least one non order-significant sequence of δ operations, or "snapshot". Sequences of delta elements with the same orientation correspond to the $\Delta_1; \ldots ; \Delta_k$ syntactic form.

Each basic operation δ is described using a dedicated element name according to its semantics (insert, insert-attr, delete, move, copy, etc). The path information may be concisely encoded, e.g. through an "ipath" attribute in the delta element. Copies of subtrees may be expressed through a "copy" attribute attached to the delta element. In that case, the latter copy attribute is an ipath with respect to the focused versioning point.

Since basic operations δ all require at least a path operand, basic operations δ may be written as $\delta_p$ to express that a basic operation δ is realized on a path p. Each basic operation δ belonging to a snapshot complies with a structural constraint that ensures orthogonality such that the snapshot is indeed commutative. In order to ensure orthogonality, it is assumed that both paths in every pair of $\delta_p$ do not designate sibling trees, and that one path does not designate a sibling tree of the parent node designated by the other path. This assumption is in place to avoid conflicting $\delta_p$'s.

Version differences Δ can be encoded in a document change history in multiple ways. The version differences Δ can be encoded with respect to the focused version of the target XML document, or they can be encoded in a "linear" mode. A change history with version differences Δ encoded in linear mode chronologically describes each incremental change between versions starting at the earliest version and ending with the latest version. In a linear mode encoding, all the delta elements only have "fwd" encodings and no "bwd" encodings since each delta is encoded with respect to the next version chronologically. For example, the delta change elements 54 and 56 of FIG. 4 show the changes that need to be made to change from version v1 to v0 and v2, respectively. The change history of FIG. 5 has encoded the change history in linear mode. The Δ's for v0 66 provide instructions for changing the target XML document 2 from v0 to v1, and the version element v1 68 contains Δ's describing how to change from v1 to v2. There are no Δ's contained in the v2 version element 70 since there is no subsequent version v3. Note that the change history shown in FIG. 5 contains some content redundancy since the target XML document 2 is focused on v1 which contains <p> element 72. The redundancy occurs because of the linear mode requiring that version element 66 include the insertion of <p> element 74 in order to describe how to change from v0 to v1.

To help remedy this redundancy, FIG. 6 illustrates the use of the copy operation 80 that conveys the same information within the Δ element without requiring that the <p> element be copied word for word.

Properties of Version Differences

The output from the diff engine describes the changes that occur between versions within an XML tree. The changes are described in a change description language such that the changes can be performed on the original XML document to produce the changed XML document. The analytical transformation of document d into a changed document d' is noted by applying Δ as follows:

$$d > \Delta > d' \quad (9)$$

In other words, the description (6) above is a logical assertion saying that a well-formed document d is changed into a well-formed document d' after the application of the well-formed Δ operation. A Δ operation is well-formed if it adheres to the properties listed below.

Formally, for any subtree A, path p, document d and d', version differences $\Delta_i$ and $\delta_i$, the document transformations can have the following abstract properties:

| Basic Operation Name | Transformation | Properties |
|---|---|---|
| (a-seq) | $d > \Delta_1; \Delta_2 > d'$ | $\exists\, d''\,,\, d > \Delta_1 > d'' \wedge d'' > \Delta_2 > d'$ |
| (a-snap) | $d > \{\delta_1 \ldots \delta_i\} > d'$ | $d > \{\delta_{\pi 1}\}; \ldots ; \{\delta_{\pi i}\} > d'$ for all permutation π defined over the sequence of indexes [1,...,i] |
| (a-void) | $d > \{\,\} > d'$ | $d = d'$ |
| (a-ins) | $d > \{\text{insert (pp, A)}\} > d'$ | get(d', pp) = $A_\wedge$ invar(d, d', pp) |

-continued

| Basic Operation Name | Transformation | Properties |
|---|---|---|
| (a-ins-@) | d > {insert-attr(pp1@nm, A)} > d' | get(d', pp/@nm) = A ∧ invar(d, d', pp/@nm) |
| (a-del) | d > {delete (pp)} > d' | get(d', pp)=get(d, pp ⊕ §pp)∧ invar(d, d', pp) |
| (a-del-@) | d > {delete (pp/@nm)} > d' | get(d', pp/@nm)=ϵ |

The definitions of the (a-ins) and (a-ins-@) properties make use of function get, which extracts the subtree rooted at a given location p. The invar property used in (a-ins), (a-ins-@) and (a-del) expresses that the subtree defined by the operand path pp is not modified by the Δ operation performed on original document d. Mathematically, the invar property is defined as:

$$invar(d, d', pp/@nm) =_{def} (\forall nm'nm' \neq nm === > get(d, pp/@nm') =$$
$$B === > get(d', pp/@nm') = B)$$

$$invar(d, d', pp/i) =_{def} [\forall p'p' << pp/i === > get(d, p') =$$
$$get(d', p') \wedge pp/i << p' === > get(d, p' = get(d', p' \oplus §p'))]$$

The ⊕, and § functions used in the properties above are inductively defined. Specifically, the path addition function ⊕ is defined over pure paths (noted pp), is commutative, and operates on paths of any depth. In other words, the path addition function ⊕ combines two given paths into a single path for evaluation. Mathematically, the path addition function ⊕ is defined as follows:

$$i/pp \oplus j/pp' = (i+j)/(pp \oplus pp') \quad (10)$$

$$i/pp \oplus j = (i+j)/pp \quad (11)$$

$$i \oplus j/pp' = (i+j)/pp' \quad (12)$$

$$i \oplus j = (i+j) \quad (13)$$

The fingerprint extraction function § calculates the depth level of a given path. Mathematically, the fingerprint extraction function § is defined as follows:

$$§(i/pp) = 0/§(pp) \quad (14)$$

$$§(i) = 1 \quad (15)$$

Thus, §(1/2/3)=0/0/1 and 1/2/3 ⊕ §(1/2/3)=1/2/4.

The (a-seq) property states that there exists an intermediate document d'' such that when $\Delta_1$ is applied to original document d, d'' is produced, and when $\Delta_2$ is applied to the intermediate document d'', then the changed document d' is produced.

The (a-snap) property states that when a snapshot (i.e., a series of basic operations δ) is applied to an original document d, then changed document d' is produced, no matter what order the basic operations δ were performed. This supports the notion of a commutative property. In other words, all deltas Δ (which may comprise one or more snapshots) are pair wise orthogonal.

The (a-void) property states that if a version difference Δ containing no changes is applied to original document d, then the changed document d' will be the same as original document d, The (a-ins) property states that after an insert operation is performed on original document d, (by inserting tree A at path pp), then the changed document d' will contain the new tree A at path pp. The (a-ins-@) property is the same as the (a-ins) property, except that it applies when the insert-attr operation inserts tree A in original document d at the path with the attribute value denoted by operand pp/@nm.

The (a-del) property states that after the delete operation is performed on original document d at path pp, the tree previously at path pp in d will no longer exist in changed document d'.

The (a-del-@) property states that after a delete operation is performed on original document d (by deleting the tree at path pp), the get function will return a null value for the changed document d' at path pp/@nm.

Inversion of Version Differences and Snapshots

An inverted delta (Δ) describes the changes that will restore an operand (i.e., a target XML document) to a prior state before a change was made. Inverted version differences Δ's are used to increase operational optimization in the exemplary method and system. The inversion of a version difference Δ requires knowing the original operand on which changes will be applied.

The inversion function can be inductively defined by the following:

$$d > \Delta_1; \Delta_2 > d' === > \exists d'' \text{ such that } invert(d, \Delta_1; \Delta_2) = \quad (16)$$
$$invert(d', \Delta_2); invert(d'', \Delta_1)$$

$$d > \{\delta_1 \ldots \delta_i\} > d' === > invert(d, \{\delta_1 \ldots \delta_i\}) = \quad (17)$$
$$\{invert(d, \delta_1) invert(d, \delta_i)\}$$

$$d > \{delete(pp)\} > d' === > invert(d, delete(p)) = \quad (18)$$
$$insert(pp, get(pp, d))$$

$$d > \{delete(pp/@nm)\} > d' === > invert(d, delete(pp/@nm)) = \quad (19)$$
$$insert\text{-}attr(pp/@nm, get(pp/@nm, d))$$

$$d > \{insert(pp, A)\} > d' === > invert(d, insert(pp, A)) = delete(pp) \quad (20)$$

$$d > \{insert\text{-}attr(p/@nm, A)\} > d' === > \quad (21)$$
$$invert(d, insert\text{-}attr(p/@nm, A)) = delete(p/@nm)$$

Delta inversion is characterized by the following property:

$$d > \Delta > d' === > d' > invert(d,\Delta) > d \quad (22)$$

The inversion of version differences Δ provides useful functionality which allows for optimal navigation within an XML tree. Moreover, it allows for a more compact representation of changes, especially when successive versions represent documents which contain only incremental changes, which is common in a standard document lifecycle.

Indeed, in such cases, subgraphs of the form:

$$v_i \xrightarrow{insert(p,A)} v_j \xrightarrow{insert(p',B)} v_k \quad (23)$$

can be rewritten using delta inversion as:

$$v_i \xleftarrow{delete(p)} v_j \xleftarrow{delete(p')} v_k \quad (24)$$

In other words, description (23) describes changing from version i to version j to version k using the insert operations. Description (24) uses an inverted Δ to illustrate going from version k to version j to version i by working backwards from version k. This allows the system to move efficiently between versions without having to recalculate a very long list of changes. Thus, one benefit of using inverted Δ's is that subtrees A and B are redundantly stored: once inside the history and once inside the current instance itself. In case the focus is set to a non-terminal versioning point (e.g. version j in the example above), deltas and inverted deltas may be combined to form:

$$v_i \xleftarrow{delete(p)} v_j \xrightarrow{insert(p',B)} v_k \quad (25)$$

which is still quite meaningful as the subtree B is only stored once inside the delta (indeed, the target XML document is conformant to $v_j$ and does not comprise the B subtree.

Note that inversion of operands of a diff operation also lead to reversed deltas (or a delta operationally equivalent to reversed delta):

$$\text{diff}(c,d,d') = \Delta ===> \text{diff}(c,d',d) = \text{invert}(d,\Delta) \quad (26)$$

Fundamental Operations Over Encapsulated Documents

The encapsulation of change history data for a target XML document within an encapsulating XML document allows for multiple management operations to be performed. The operations performed by the exemplary method and system allow for the creation of an encapsulating document, the versioning of a modified target XML document, the merging of two separate versions of a target XML document, the focusing of a target XML document on a specified version, and the extraction of a target XML document from an encapsulating document.

Figure 7:
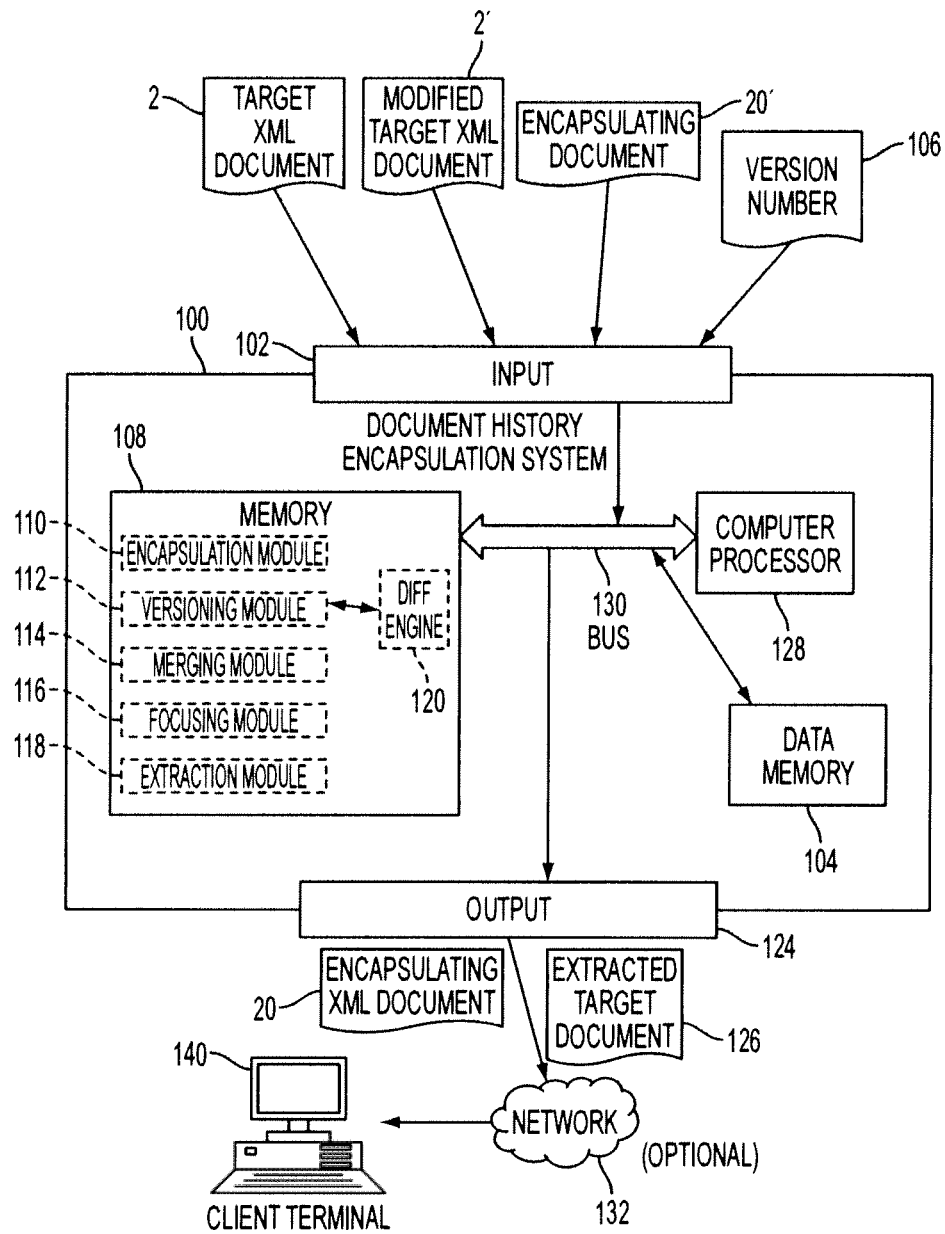
FIG. 7 is a high-level overview of an exemplary system for encapsulating and handling a target XML document and related document change history.

FIG. 7 illustrates an exemplary system 100 for encapsulating document history within an ecapsulating XML document 20 implemented in a computer device. The system 100 includes an input device 102, for receiving a target XML document 2 to be encapsulated. The system 100 may also be configured to receive a previously generated encapsulating document 20' containing a target XML document and change history, and/or a user-selected version number 106, or other identifier for a previously encapsulated version of the target document, that is used for certain operations. Prior to inputting, the target XML document 2, encapsulating document 20' and version number 106 may be stored in any suitable tangible media such as a ROM or RAM drive or may be input into the system 100 in the form of a carrier wave, e.g., via the Internet. Alternatively, the target XML document 2, encapsulating document 20' and the version number 106 may be generated within the system 100, itself. The input device 102 may include a modem link, a wired or wireless connection, USB port, floppy or hard disk receiver, or the like and may be separated or combined with other components of the system 100.

The system 100 includes data memory 104 for storing the target XML document 2 and the version number 106 while the document 2 is being processed. Main memory 108 of the system 100 stores an encapsulation module 110, versioning module 112, merging module 114, focusing module 116, extraction module 118, and diff engine 120. Outputs from modules 110, 112, 114, 116, 118, 120 may be stored in memories 104, 108 or output via an output device 124 to a client terminal 40, optionally through a network 132 such as the internet.

The encapsulation module 110 receives as input the target XML document 2 via the input device 102, and encapsulates the target XML document 2 within a newly created encapsulating document 20. The encapsulation module 110 then outputs the encapsulating document 20 via output device 124, or stores it in memory 104. The versioning module 112 receives as input an encapsulating document 20 or 20' and a modified target XML document 2' (which may have been created by a user through modifications to target XML document 2). The versioning module 112 creates a versioning point within the input encapsulating document 20 with the assistance of the diff engine 120. The versioning module 112 then outputs the modified encapsulating document 20 via output device 124, or stores it in memory 104. The merging module 114 receives as input an encapsulating document 20 (or 20') and a version number or other user-selected identifier 106. The merging module 114 merges the target XML document within the encapsulating document 20 with a versioning point identified by the input version number 106. The merging module 114 then encapsulates and outputs the merged target XML document within an encapsulating document 20 for output. The focusing module 116 receives as input an encapsulating document 20 (or 20') and a selected version number 106. The focusing module 116 then re-encodes the focused encapsulating document 20 such that the target XML document and history contained within the encapsulating document reflect the version state indicated by the input version number 106. The focusing module 116 then outputs the re-encoded encapsulating document 20. The extraction module 118 receives as input an encapsulating document 20 (or 20') and extracts the encapsulated target XML document 2 from within the encapsulating document 20. The extraction module 118 then outputs the extracted target XML document 126.

The encapsulation module 110, versioning module 112, merging module 114, focusing module 116, extraction module 118, and diff engine 120 may be implemented as hardware or a combination of hardware and software thereof. In the exemplary embodiment, the components 110, 112, 114, 116, 118, 120 comprise software instructions stored in main memory 108, which are executed by a computer processor 128. The processor 128, such as the computer's CPU, may control the overall operation of the computer system 100 by execution of processing instructions stored in memory 108. Components 102, 104, 108, 110, 112, 114, 116, 118, 120, 124, 128 may be connected by a data control bus 130. As will be appreciated, system 100 may include fewer components. For example, the merging and focusing modules 114, 116 may be omitted.

As will be appreciated, the document history encapsulation and management system 100 may comprise one or more computing devices, such as a personal computer, PDA, laptop computer, server computer, or combination thereof. Memories 104, 108 may be integral or separate and may represent any type of computer readable medium such as random access memory (RAM), read only memory (ROM), magnetic disk or tape, optical disk, flash memory, or holographic memory. In one embodiment, the memories 104, 108 comprise a combination of random access memory and read only memory. In some embodiments, the processor 128 and memory 104 and/or 108 may be combined in a single chip.

Figure 8:
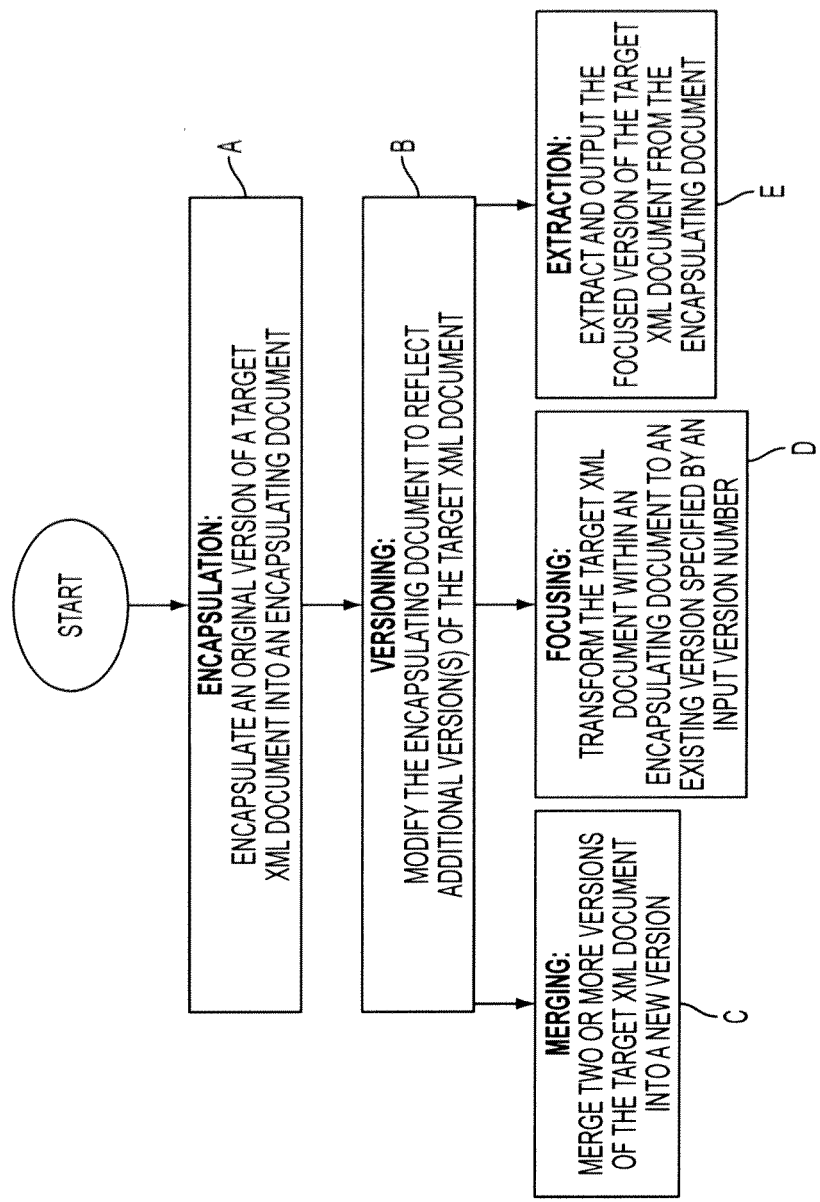
FIG. 8 is a flow diagram generically illustrating the operations performed by the exemplary system of FIG. 7.

FIG. 8 illustrates an overall document processing method which may be performed with system 100. The method may include some or all of the following processing steps A, B, C, D, and E. As described in FIG. 8, step A encapsulates an original version of a target XML document 2 into an encapsulating document 20. This step may be performed by the encapsulation module 110. Step B performs a versioning operation by modifying the encapsulating document 20 to reflect additional version(s) 2' of the target XML document 2. This step may be performed by the versioning module 112. Step C performs a merging operation that merges two or more versions of the target XML document 2 within an encapsulating document 20 into a new version. The new version of the target XML document 2 is then encoded into the encapsulating document 20. This step may be performed by the merging module 114 of system 100. Step D performs a focusing operation that transforms the target XML document 2 within an encapsulating document 20 to a version specified by an input version number. This step may be performed by the focusing module 116 of system 100. Step E performs an extraction operation that extracts and outputs the focused version of the target XML document 2 from within the encapsulating document 20. This step may be performed by the extraction module 118.

Method for Creating an XML Document History (Step A)

Figure 9:
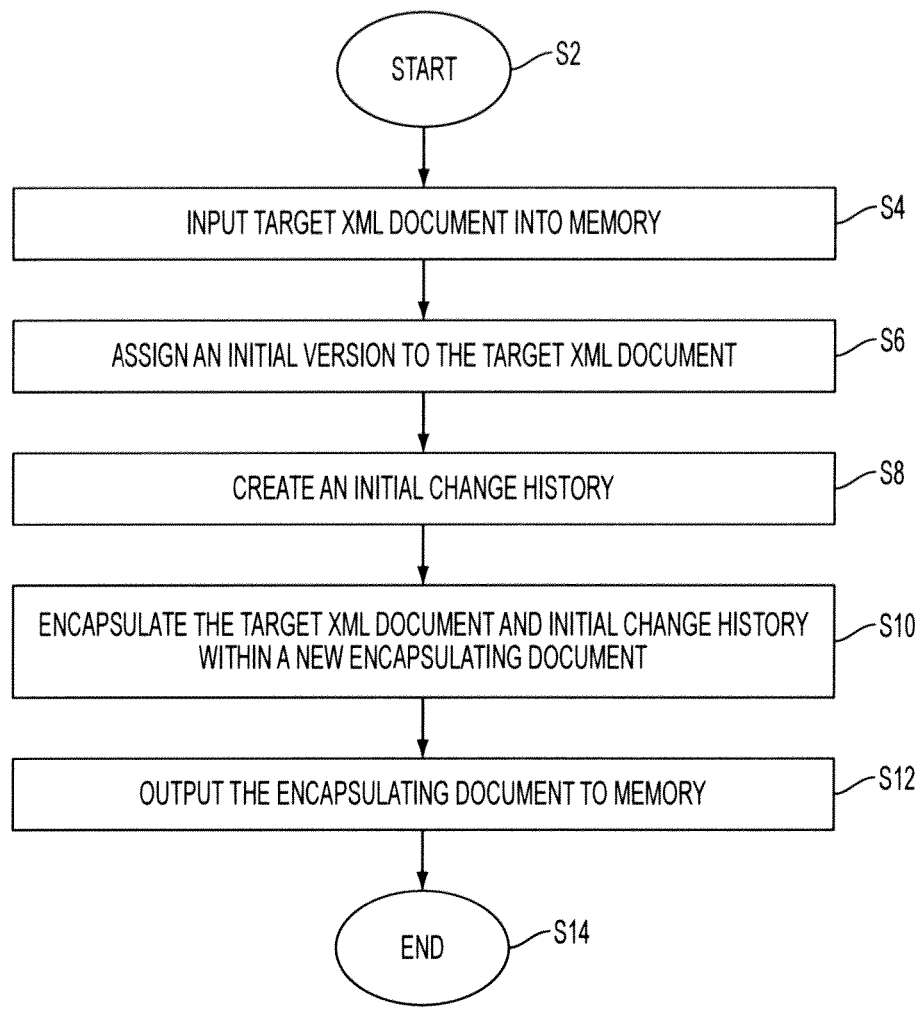
FIG. 9 is a flow diagram illustrating a method for encapsulating a target XML document and its change history within an encapsulating XML document.

With reference to FIG. 9, an exemplary method for encapsulating a target XML document 2 is illustrated. The method may employ the system 100 illustrated in FIG. 7. It is to be appreciated that the exemplary method may include fewer, more, or different steps from those shown and need not proceed in the order illustrated. The method illustrated in FIG. 9 and all subsequent methods disclosed may be implemented in a computer program product that may be executed on a computer. The computer program product may be a tangible computer-readable recording medium on which a control program is recorded, or may be a transmittable carrier wave in which the control program is embodied as a data signal. The illustrated methods may be entirely automated or may include some user input, as noted herein.

As a general overview, the encapsulation operation can be represented by the following signature:

$$\text{create-history}(d) \rightarrow x\text{-version}[x\text{-body}_{v0}[d], x\text{-history}[v_0]] \quad (27)$$

where d is a target XML document 2. The signature reflects that target XML document d is encapsulated inside the <x-body> element (as shown in FIG. 2) of the encapsulating document 20, and that an initial versioning point v0 is created inside the <x-history> element. The link that relates the embedded target XML document with the consistent versioning point is inserted in the x-body subtree, as illustrated by code 27 (FIG. 2).

The method begins at step S2. At step S4, a version of target XML document 2 is received into data memory 104.

At step S6, an initial version number is assigned to the target XML document 2, as shown by 26 (FIG. 2). In the exemplary method presented herein, the initial version of a document is "v0", but any other version numbering system may be used.

At step S8, an initial change history element 22 (FIG. 2) is created. The initial history 22 will contain only a versioning point for v0 28, since v0 is the only version that exists and no changes have been made to the target XML document 2.

At step S10, the original version of the target XML document 2 and initial change history 22 (FIG. 2) are encapsulated within a new encapsulating document 20. In one alternative embodiment, instead of encoding the entire target XML document, an inclusion link or external reference is used in lieu of encoding the entire target XML document. For instance, in FIG. 2, the original version of target XML document 2 may be replaced by an URL or other link to a document or file containing the target XML document.

At step S12, the encapsulating document 20 is output to memory 104, or to another output device such as client terminal 140 via the output device 124.

The method ends at step S14.

Figure 10:
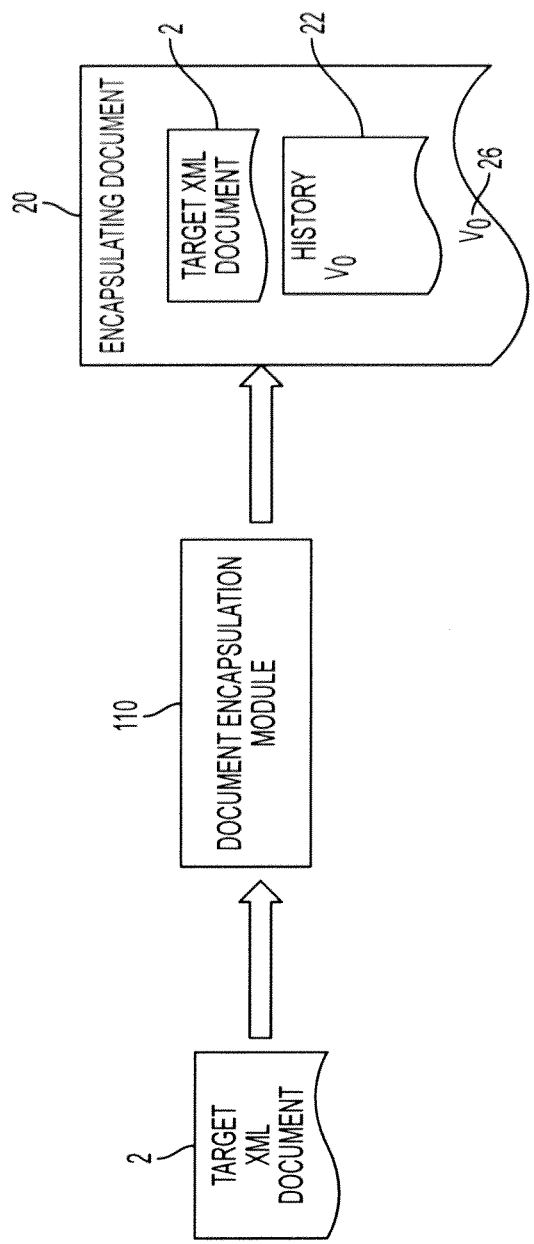
FIG. 10 is a high-level view of the encapsulating method illustrated in FIG. 9.

With reference to FIG. 10, the encapsulation method of FIG. 9 is illustrated graphically. Notably, the original version of target XML document 2 is input into the document encapsulation module 110 which produces an encapsulating document 20 containing both the original version of target XML document 2, version history 22 and a link to the currently focused version 27 embodied by the target XML document 2.

Method for Versioning a Modified Target Document (Step B)

Figure 11:
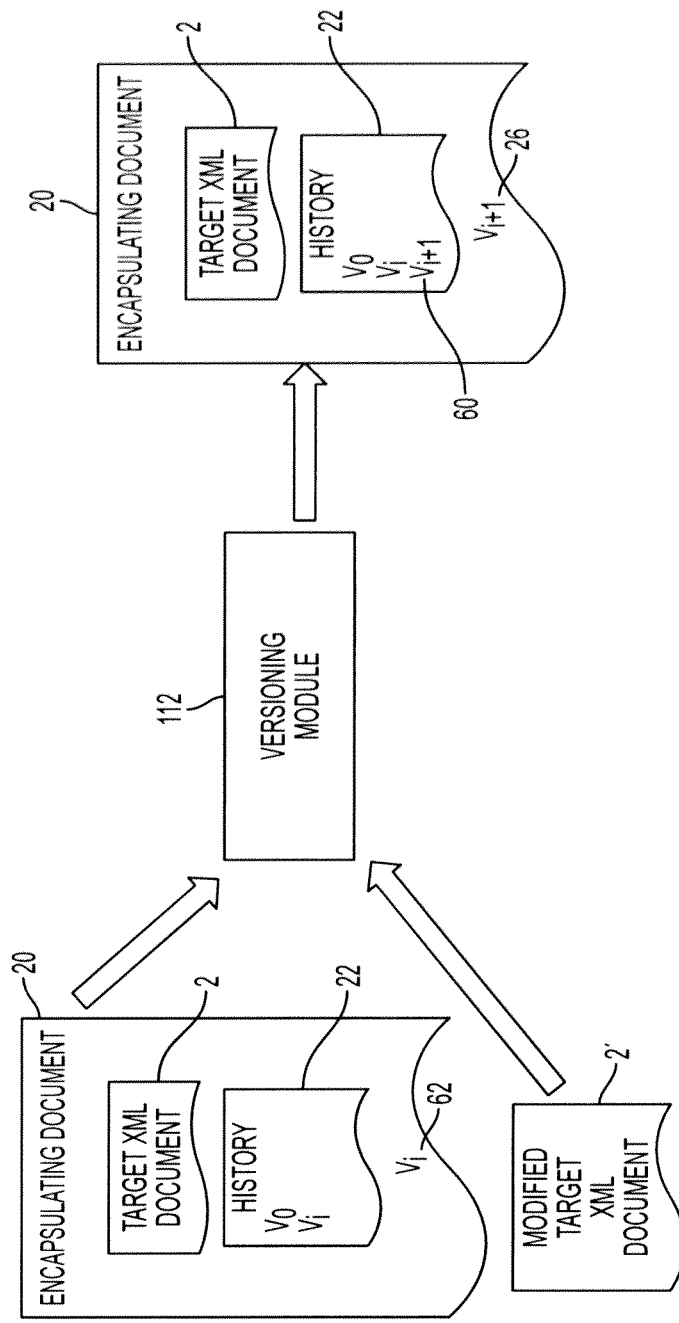
FIG. 11 is a high-level view of the versioning method performed by versioning module contained within the system illustrated in FIG. 7.
Figure 12:
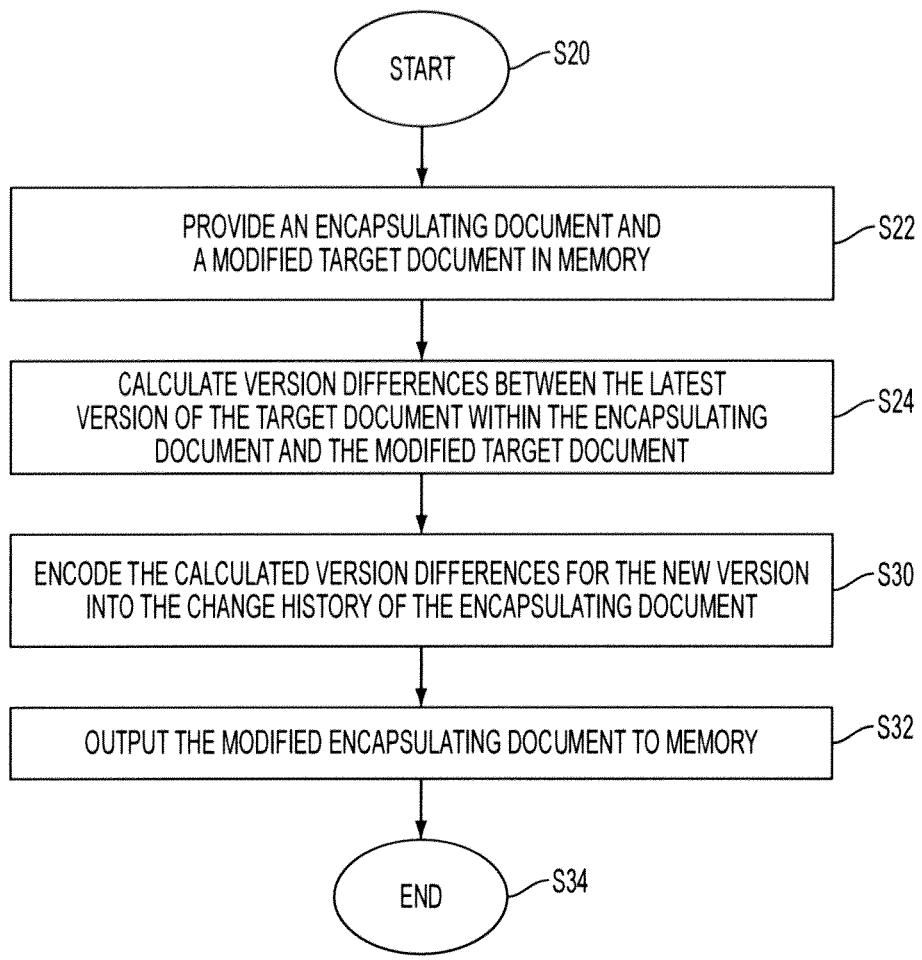
FIG. 12 is a flow diagram illustrating in more detail the versioning method described by FIG. 11.

With reference to FIGS. 11 and 12, an exemplary method for versioning a modified target XML document 2' is illustrated. This may be performed when an encapsulating document 20 (or 20') has already been generated and the original target document 2 has been modified to create a new version 2'. This method may employ the system 100 illustrated in FIG. 7.

As a general overview, FIG. 11 illustrates the versioning method in a graphical manner. The versioning method requires two operands: an encapsulating document 20 (e.g., as created at S10) and a modified variant (new version) of the target XML document 2' which is to be considered as a novel versioning point. The output of the versioning method is a modified encapsulating document 20 including a new versioning point 60, a consistent link in the form of code 26 indicating which version of the target XML document 2 is encoded, and a transition from the previous versioning point to the new one. The resulting target XML document 2 and consistent link 26 may correspond to a version of the target XML document 2 that is not the latest version (i.e., $v_i$ instead of $v_{i+1}$ as shown). In this case, only the change history 22 would be altered by the versioning method. This transition ($\Delta$) encompasses the basic operations computed by the diff engine 120. The versioning operation may be represented by the following signature:

$$\text{create-version}(x\text{-version}[x\text{-body}_{vi}[d], x\text{-history}[v_i], d') \rightarrow x\text{-version}[x\text{-body}_{vj}[d], x\text{-history}[v_i \rightarrow^\Delta v_j]] \text{ with diff}(c,d,d') = \Delta \quad (28)$$

where d is a target XML document, $v_i$ is the version 62 of the input target XML document 2, and $v_j$ is the new versioning point 27, c is a set of parameters used to configure the diff engine, d is the original target XML document 2, and d' is a modified target XML document 2' (i.e., a new version of the original document 2).

With reference to FIG. 12, the method begins at step S20. At step S22, an encapsulating document 20, containing a first version of target XML document 2, and a modified version of target XML document 2 are received into data memory 104, via input device 102 (if not already stored in memory 104, 108).

At step S24, the diff engine 120 computes basic operations $\delta$ between the original version (e.g., v0) of the target XML document 2 within the encapsulating document 20 and the modified version (e.g., v1) of the target XML document 2'. In the exemplary method, the previous version number 62 is increased by one (i.e., from v0 to v1) to create the new version number 26.

At step S30, the calculated basic operations $\delta$ for the new target XML document are encoded into the history 22 of the modified encapsulating document 20 with respect to the new version number 26.

At step S32, the new modified encapsulating document 20 is output to memory 104, or to another output device such as client terminal 140 via the output device 124.

The method ends at S34.

Method for Merging Two Versions of a Target XML Document (Step C)

Figure 13:
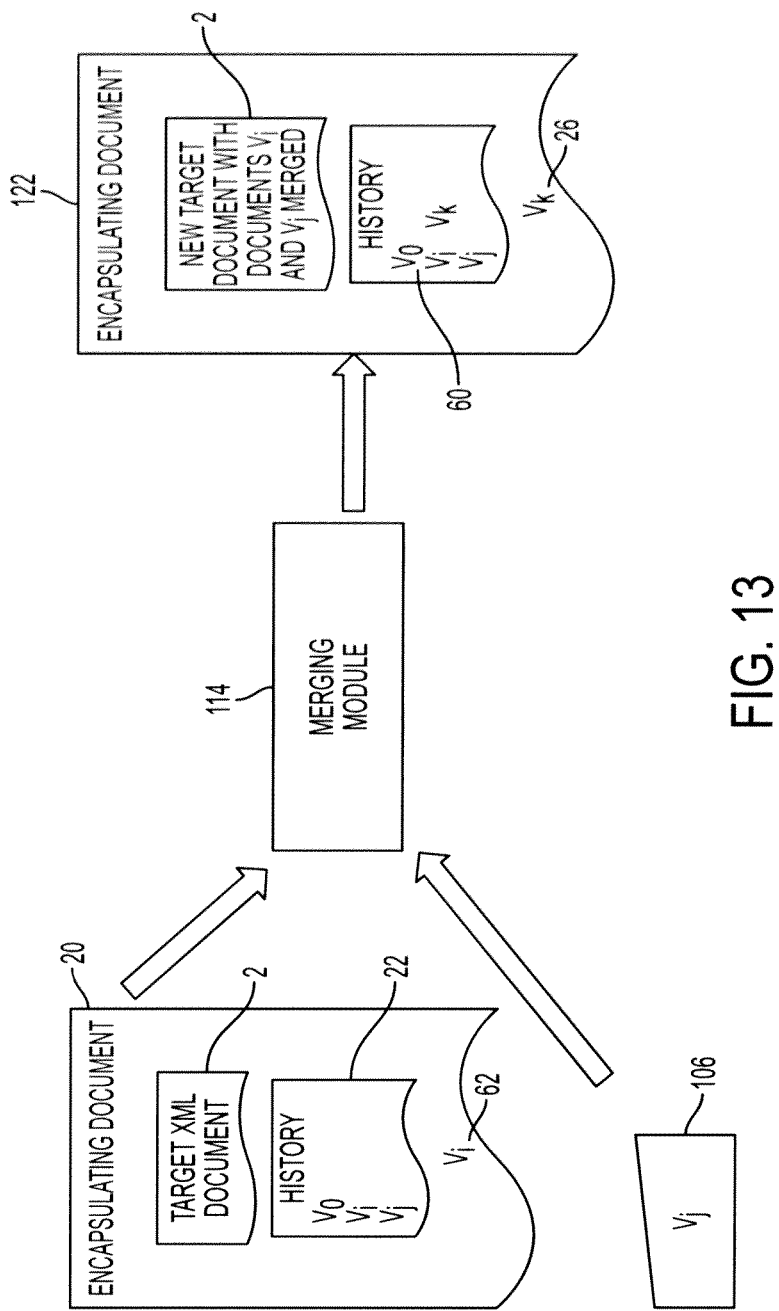
FIG. 13 is a high-level view of the merging method performed by the merging module contained within the system illustrated in FIG. 7.
Figure 14:
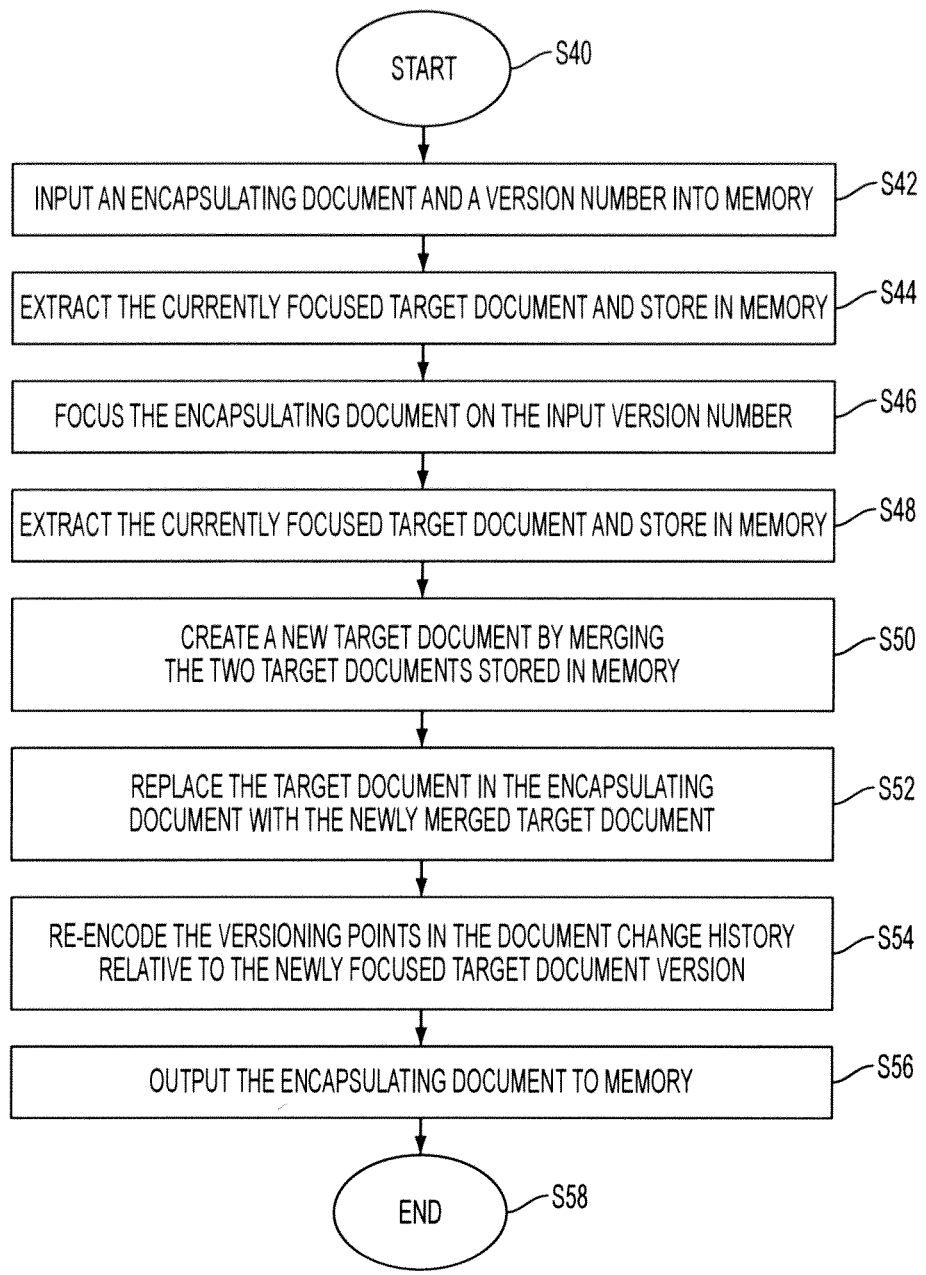
FIG. 14 is a flow diagram illustrating in more detail the merging method described by FIG. 13.

With reference to FIGS. 13 and 14, an exemplary method for merging a modified target XML document 2' is illustrated. This method may employ the system 100 illustrated in FIG. 7.

As a general overview, FIG. 13 illustrates the merging method in a graphical manner. The merging operation requires two operands: the encapsulating document 20 containing a target XML document 2 and a version number 106 that is part of the version history 22 contained in the encapsulating document 20. The merging module 114 implements a merging algorithm that creates a novel versioning point 26 and two transitions (version differences Δ) that relate the two original versioning points 62, 106 to the new one 26. The object is to perform a maximum preserving merge (no deletion in the respective version differences). However, in the event that merging conflicts arise, one aspect of the exemplary method handles conflicts through the use of a dedicated annotation inside the target XML document. This annotation may be based on a foreign namespace which does not conflict with namespaces used by target XML document. The merging operation has the following abstract signature:

$$\text{merge}(x\text{-version}[x\text{-body}_{vi}[d], x\text{-history}[v_i]), v_j) \to x\text{-version}[x\text{-body}_{vk}[d'], x\text{-history}[v_i \to^{\Delta i} v_k, v_j \to^{\Delta j} v_k]]$$
with $d_{vi} > \Delta_i > d'$ and $d_{vj} > \Delta_j > d'$ \hfill (29)

where d is the target XML document 2, $v_i$ is the focused version 2' of the target XML document, $v_j$ is the input version number 106 to merge with version $v_i$, d' is the merged target XML document, and $v_k$ is the new merged version 60 of the target XML document 2'. Basically, the merge creates a new version $v_k$ with a set of deltas ($\Delta_i$ and $\Delta_j$) such that if $\Delta_i$ is applied to the target XML document focused on version $v_i$ and $\Delta_j$ is applied to version $v_j$ of the target XML document, then the merged document version $v_k$ is produced in both cases.

With reference to FIG. 14, the method begins at step S40. At step S42, an encapsulating document 20 containing a versioned target XML document 2 and corresponding change history 22, as well as a version number 106 are input into memory 104 via input device 102 (if not already created and/or stored in memory 104, 108). Version number 106 may be selected by a user, e.g. via client terminal 140 (FIG. 7).

At step S44, the merging module 114 extracts the focused version 62 (FIG. 13) of target XML document 2 from the encapsulating document 20 and stores it in memory 104 (FIG. 7). The merging module 114 may utilize the extraction module 118 to perform this step.

At step S46, the merging module 114 focuses the encapsulating document 20 onto the version corresponding to input version number 106. This step provides for easier extraction of the version of the target document 2 corresponding to the input version number 106. As explained below, once the newly focused version (corresponding to the input version number 106) is extracted, it is easily merged with the previously extracted version 62 of the target XML document 2. The merging module 114 may utilize the focusing module 116 for this step.

At step S48, the merging module 114 extracts the focused version of target XML document 2 (which is focused on the input version number 106) from the encapsulating document 20 and stores this version of target XML document 2 in memory. The merging module 114 may utilize the extraction module 118 to perform this step.

At step S50, the merging module 114 creates a new version of target XML document 2 by merging the two extracted target XML document versions (one version corresponding to the input version number 106 and the other version corresponding to the previously focused version number 62) into a new target XML document 2. Any merging algorithm which is capable of merging XML document trees may be used. The merging module 114 also creates a new version number 26 that will be used for the versioning point in the change history 60.

At step S52, the merging module 114 replaces the target XML document 2 in the encapsulating document 20 with the merged target XML document 2', to form a new encapsulating document 20.

At step S54, the merging module 114 re-encodes the versioning points in the encapsulating document 20 change history 60 relative to the new version number 26 created in step S50. As discussed above, the previous versioning points 62, 106 include new deltas which will allow transformation from the previous versioning points 62, 106 to the new versioning point 26. Optionally, the new versioning point 26 may contain deltas to allow for transformation backwards to the previous versioning points 62, 106.

At step S56, the newly modified encapsulating document 20 is output to memory 104, or to another output device such as client terminal 140 via the output device 124.

The method ends at step S58.

Method for Focusing an Encapsulating Document to a Specified Version of a Target XML Document (Step D)

Figure 15:
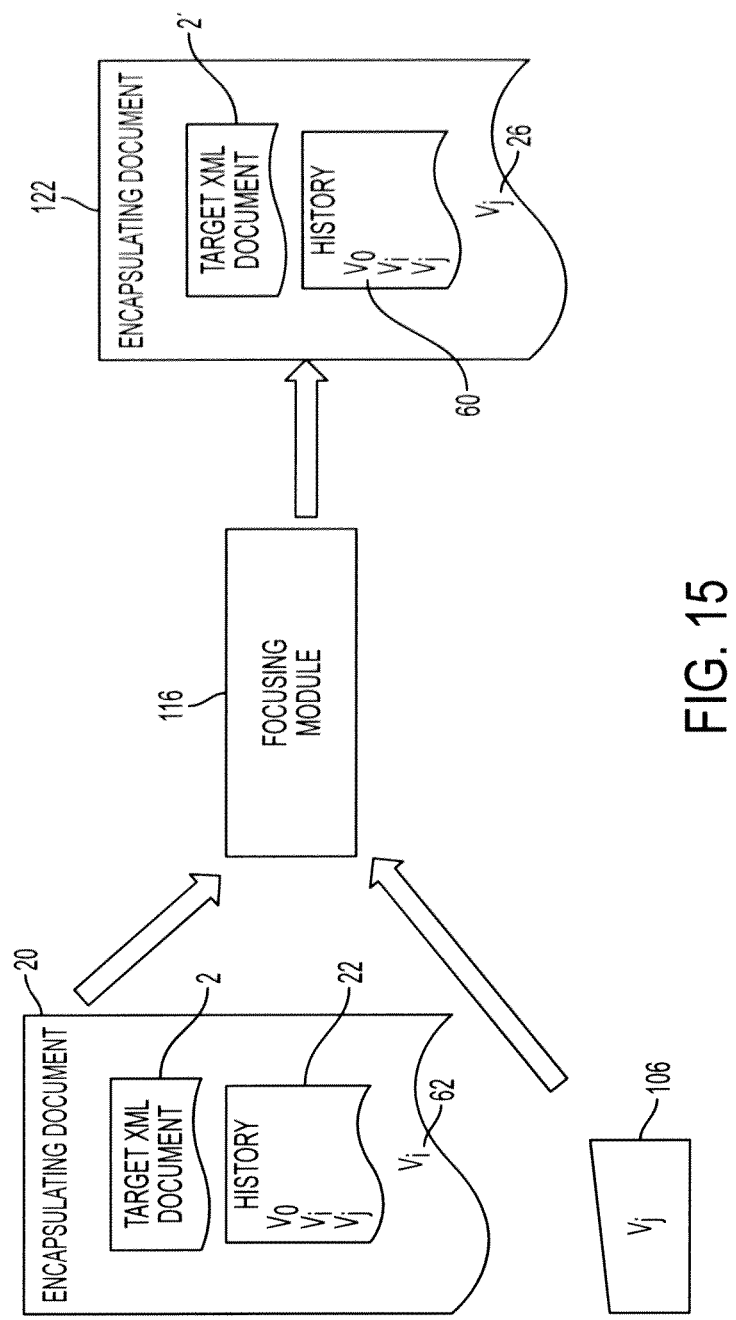
FIG. 15 is a high-level view of the focusing method performed by the focusing module contained within the system illustrated in FIG. 7.
Figure 16:
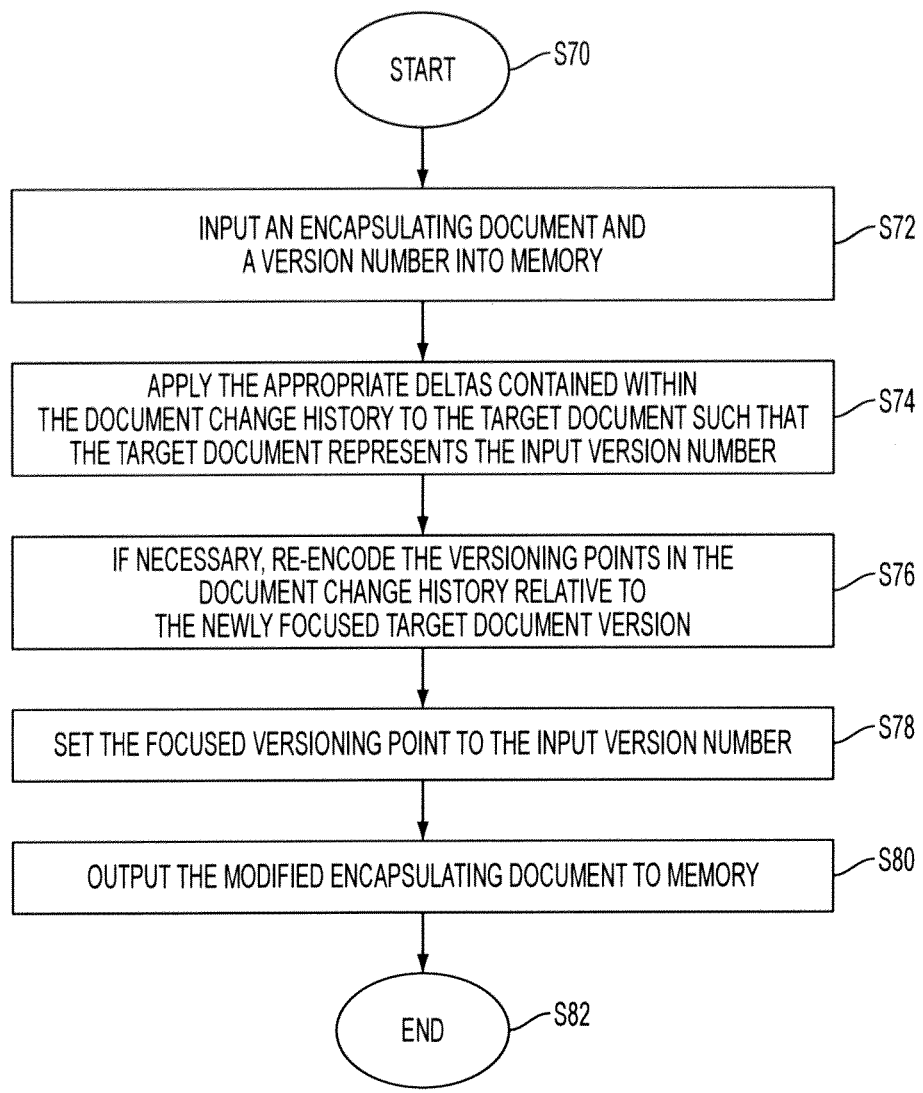
FIG. 16 is a flow diagram illustrating in more detail the focusing method described by FIG. 15.

With reference to FIGS. 15 and 16, an exemplary method for focusing an encapsulated target XML document 2 to an input version 106 number is illustrated. This method may employ the system 100 illustrated in FIG. 7.

As a general overview, FIG. 15 illustrates the focusing method in a graphical manner. The focusing operation allows for the modification of a target XML document 2 embedded in an encapsulating document 20 in order to be compliant with a given version 106 stored in the document history 22. This involves applying the appropriate version differences Δ to the target XML document 2 that connect the current versioning point $v_i$ 62 to the input versioning point $v_j$ 106. The focusing operation has the following abstract signature:

$$\text{focus}(x\text{-version}[x\text{-body}_{vi}[d], x\text{-history}[v_i]), v_j) \to x\text{-version}[x\text{-body}_{vj}[d'], x\text{-history}[v_j]] \text{ with}$$
$$v_i \to^{\Delta i} \ldots \to^{\Delta j} v_j \text{ and } d > \Delta; \ldots; _{\Delta j} > d'. \hfill (30)$$

where d is the target XML document 2, $v_i$ is the originally focused version 62 of the target XML document 2, $v_j$ is the input version number 106 on which to focus, and d' is the focused target document corresponding to focused version $v_j$. Specifically, the focus operation finds and applies the set of deltas ($\Delta_i$ to $\Delta_j$) that will transform the target XML document 2 from version $v_i$ to version $v_j$. Note that the set of deltas may contain deltas of the form $v_n \leftarrow^{\Delta n} v_m$ which requires the computation of one or more inverse deltas.

With reference to FIG. 16, the method begins at step S70. At step S72, an encapsulating document 20 containing a target XML document 2 focused on version $v_i$ 62 and a change history 22, as well as a version number $v_j$ 106 are input into memory 104 via input device 102 (if not already stored in memory 104, 108)

At step S74, the focusing module 116 applies the appropriate deltas contained within the document change history 22 to the target XML document 2 such that the target XML document 2 is in the state corresponding to the input version number 106. For example, with reference to FIG. 4, the current version link 26 is v1. If the input version number 106 is "v2", then the focusing module 116 would apply delta 56 to the target XML document 2 since delta 56 will transform the target XML document 2 from v1 to v2. At step S76, the focusing module 116 re-encodes the versioning points in the document change history 60 relative to the newly focused target XML document 2 version 26. For example, with respect to FIG. 4, once the target XML document 2 is focused to v2, versioning point v2 62 may have delta elements added to transition "bwd" (backward) to v1. Many delta encodings are possible, and may depend on the diff engine 120 used to encode the encapsulating document 20 originally. For example, in one aspect of the exemplary method and system, the diff engine output is normalized to condense a set of possibly many equivalent deltas to a unique reference delta that expresses the same resulting target XML document.

At step S78, the focusing module 116 sets the focused version point (i.e., the version link) 26 to the input version number 106 so that the focused target XML document 2 is directly tied to a versioning point in the change history 20.

At step S80, the focusing module 116 outputs the encapsulating document 20 containing the focused target XML document 2 and re-encoded change history 60 to memory 104, or to another output device such as client terminal 140 via the output device 124.

The method ends at step S82.

Method for Extracting a Target XML Document from within an Encapsulating Document (Step E)

Figure 17:
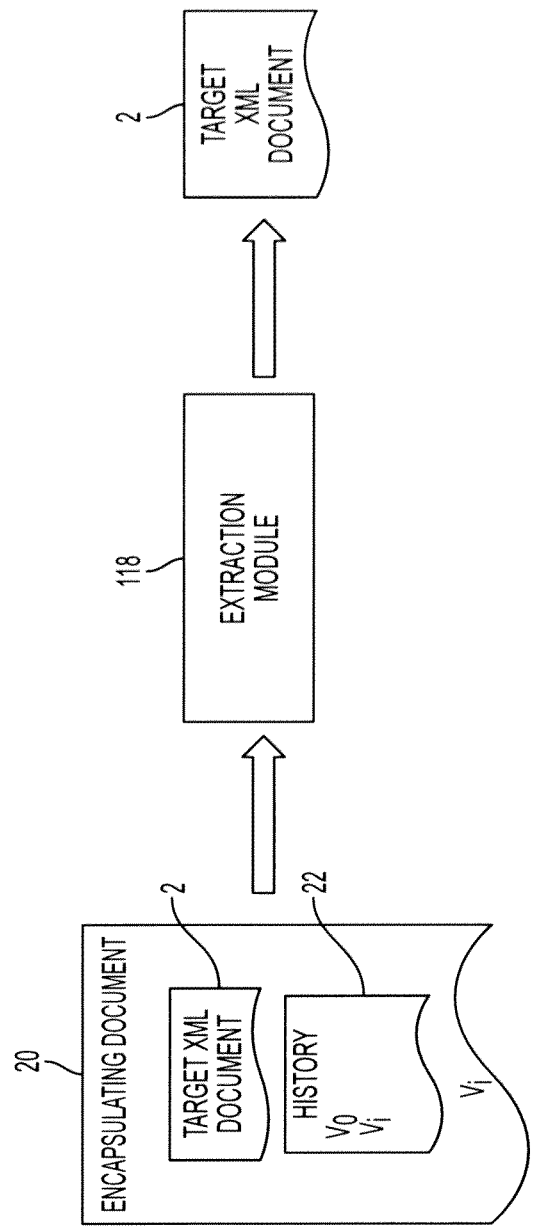
FIG. 17 is a high-level view of the extraction method performed by the extraction module contained within the system illustrated in FIG. 7.
Figure 18:
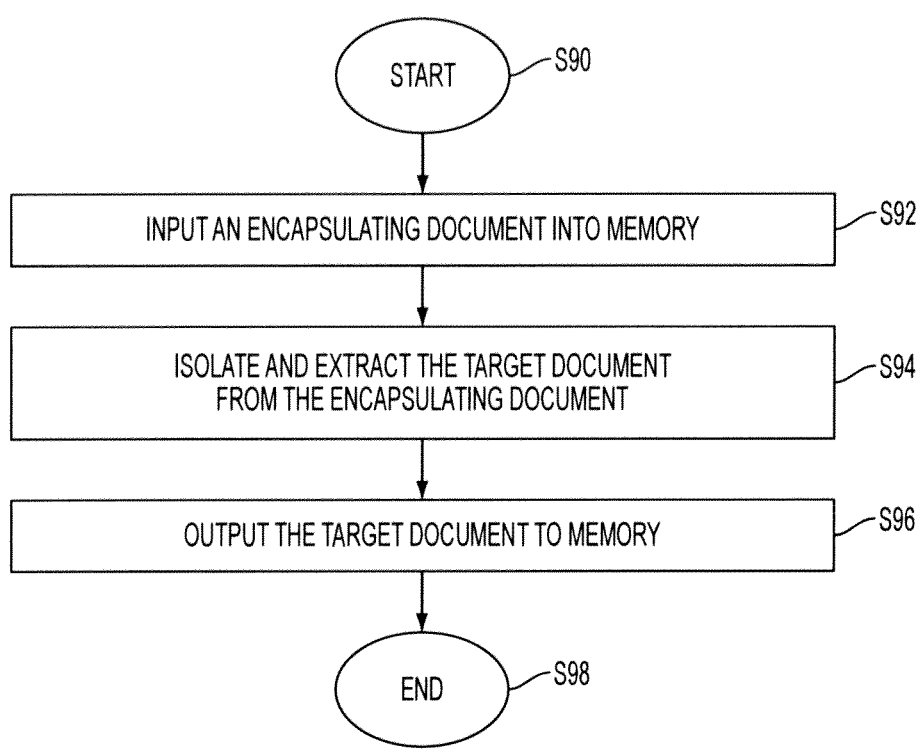
FIG. 18 is a flow diagram illustrating in more detail the extraction method described by FIG. 17.

With reference to FIGS. 17 and 18, an exemplary method for extracting a target XML document from an encapsulating document is illustrated. This method may employ the system 100 illustrated in FIG. 7.

As a general overview, FIG. 17 illustrates the extraction method in a graphical manner. The extraction operation requires only one operand: the encapsulating document 20 containing the target XML document 2 to be extracted. The method outputs an extracted target XML document 2 without any of the encapsulating information. This method is useful for updating or changing a target XML document 2 embedded within an encapsulating document 20. The extraction operation has the following abstract signature:

$$\text{extract}(x\text{-version}(\text{body}_{vi}[d], x\text{-history}[v_i])) \to d \qquad (31)$$

where "x-version(body$_{vi}$[d], x-history[v$_i$])" is the encapsulating document 20, d is the target XML document, and v$_i$ is the currently focused version 62 of the encapsulating document 20.

With respect to FIG. 18, the method begins at step S90. At step S92, an encapsulating document 20 containing a target XML document 2 is received into memory 104 via input device 102.

At step S94, the extraction module 118 isolates and extracts the target XML document 2 from the encapsulating document 20. This can be performed by any XML parser capable of extracting nodes and/or subtrees from an XML document.

At step S96, the extraction module 118 outputs the extracted target XML document 2 to memory 104, or to another output device such as client terminal 140 via the output device 124 (if not already stored in memory 104, 108).

The method ends at step S98.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

APPENDIX A default namespace xversion = "LOC::DS::X-Version"
datatypes xsd = "http://www.w3.org/2001/XMLSchema-datatypes"
start = x-version

APPENDIX A-continued

```
anyElement = element * - xversion:* { anyAttribute*, anyElement*} |
text anyAttribute = attribute * { text}
x-version = element x-version {
    element x-version-body {
        attribute ref {V-REF},
        attribute xml:space {"preserve" | "ignore"}?,
        SUBTREE
    }+,
    element x-version-history {
        attribute first {list {V-REF+}},
        attribute last {list {V-REF+}},
        # the version history encodes a DAG (Directed Acyclic Graph)
        version*
    }
}
version = element version {
    attribute id { V-REF},
    # allows zero or more
    attribute conflicts {xsd:nonNegativeInteger}?,
    a-time?,
    delta*
}
a-target=
    # this attribute defines a "one-step" next version
    attribute to {V-REF}
delta = element delta { a-target, (rename | insert | append | move |
copy | delete | replace)* }
a-here=
    # the "here" attribute designates the insertion point (existing stuff
is to be shift to right after insertion)
    attribute here {IPath}
insert=
    # "insert" only applies to elements, text, comment and PI
    element insert {
        a-here,
        # the subtree to be inserted is here (but skipped thanks to a NVDL
rule)
        SUBTREE
    }
append=
    # "append" applies to everything including attributes
    # for elements, text, comments, PI, the item is appended at the end of
the sequence of children
    element append {
        a-here,
        # the "attribute" attribute is used to specify attribute insertion; it
must have the "QName=Value" syntactic structure
        ((attribute attribute {A-DEF}?, empty) | SUBTREE)
    }
copy= element copy {
    a-what, a-here,
    attribute append {flag}?
}
move= element move {
    a-what, a-here,
    attribute append {flag}?
}
delete= element delete { a-what, SUBTREE }
replace= element replace { a-what, SUBTREE }
rename=
    # works for elements, attributes, and PI as well
    # the "as" attribute is a qualified name (that is, may refer to a
given namespace through a declared prefix
    element rename { a-what, attribute as {token}}
SUBTREE=anyElement | conflict
conflict=element conflict { item+ }
item = element item { attribute ref {V-REF}, anyElement }
attribute-conflict =element attribute-conflict { attribute ref {V-REF}, A-
DEF}
tree-conflict = element tree-conflict { attribute ref {V-REF}, A-DEF}
kind = element kind {flag }
generic-paths = element generic-paths { flag }
dump-xsl = element dump-xsl {flag}
dump-config = element dump-config { flag }
dump-source = element dump-source { uri? }
dump-ref = element dump-ref { uri? }
extrude = element extrude {
    attribute where {RelativeXPath},
    attribute what {RelativeXPath}
}
```

APPENDIX A-continued

```
skip= element skip {RelativeXPath}
skip-empty-text= element skip-empty-text { xflag }
normalize-text = element normalize-text { xflag }
V-REF= xsd:string { pattern="v\d+(\.\d+)*" }
A-DEF=string
flag = "yes" | "no"
xflag = "xml" | flag
```

APPENDIX A-continued

```
a-what = attribute what {XPath}
   a-time = attribute time {xsd:dateTime}
uri=xsd:anyURI
RelativeXPath = xsd:string
XPath = xsd:string
IPath = xsd:string { pattern="1(/\d+)*(/@([\c-[:]]+:)?[\c-[:]]+)?" }
```

APPENDIX B

```xml
<?xml version="1.0" encoding="UTF-8"?>
<sch:schema xmlns:sch="http://purl.oclc.org/dsdl/schematron" xml:lang="en"
queryBinding="xslt2">
    <sch:ns uri="LOC::DS::X-Version" prefix="xv"/>
    <sch:pattern >
        <sch:let name="versions" value="/*[1]/*[2]/xv:version"/>
        <sch:let name="versions-id" value="for $i in $versions/@id return
normalize-space ($i)"/>
        <sch:let name="Nversions-id" value="distinct-values($versions-
id)"/>
        <sch:let name="history" value="/*[1]/xv:x-version-history[1]"/>
        <sch let name="starting-vector" value="tokenize(normalize-
space($history/@first),'\s')"/>
        <sch:let name="ending-vector" value="tokenize(normalize-
space($history/@last),'\s')"/>
        <sch:let name="Nstarting-vector" value="distinct-values($starting-
vector)"/>
        <sch:let name="Nending-vector" value="distinct-values{$ending-
vector)"/>
        <sch:rule context="/*[1]/xv:x-version-history[1]">
            <sch:assert test="count($versions-id) ge count($Nversions-
id)">Every version element must have an unique id attribute</sch:assert>
            <sch:assert test="count($starting-vector) eq count ($Nstarting-
vector)">"first" attribute should refer to each relevant version only
once</sch:assert>
            <sch:assert test="count($ending-vector) eq count($Nending-
vector)">"last" attribute should refer to each relevant version only
once</sch:assert>
            <sch:assert test="every $i in $Nstarting-vector satisfies
index-of($Nversions-id,$i) gt 0 ">
                the "first" attribute should point to existing version(s)
(cf
                "<sch:value-of select="string-join($Nstarting-
vector,'/')"/>" versus "<sch:value-of select="string-join($Nversions-
id,'/')"/>"
                )
            </sch:assert>
            <sch:assert test="every $i in $Nending-vector satisfies index-
of($Nversions-id,$i) gt 0 ">
                the "last" attribute should point to existing version(s)
(cf
                "<sch:value-of select="string-join($Nending-
vector,'/')"/>" versus "<sch:value-of select="string-join($Nversions-
id,'/')"/>"
                )
            </sch:assert>
        </sch:rule>
        <sch:rule context="xv:version">
            <sch:report test="count(index-of($versions-id,normalize-
space(@id))) gt 1">
                The "id" attribute must be unique ("<sch:value-of
select="@id"/>")
            </sch:report>
            <sch:let name=" my-id" value="@id"/>
            <sch:assert test="(count(../xv:version/xv:delta[@to=$my-id])
gt 0) or (index-of($Nstarting-vector,$my-id) gt 0)">
                missing back link to anterior version (version
"<sch:value-of select="@id"/>")
            </sch:assert>
            <sch:assert test="(count(xv:delta[@to) gt 0) or (index-
of($Nending-vector,$my-id) gt 0)">
                missing link to posterior version (version "<sch:value-of
select="@id"/>")
            </sch:assert>
        </sch:rule>
        <sch:rule context="xv:delta">
            <sch:assert test="index-of($Nversions-id,@to) gt 0">
                The link to version "<sch:value-of select="@to"/>" is
```

APPENDIX B-continued

```
dangling (no corresponding version found in the whole history)
            </sch:assert>
            <sch:let name="my-dest" value="@to"/>
            <sch:report test="count(preceding-sibling::xv:delta[@to=$my-dest]) gt 0" >
                Delta must be unique for one target version ("<sch:value-of select="@to"/>")
            </sch:report>
        </sch:rule>
        <sch:rule context="xv:conflict">
            <sch:let name="all-item-refs" value="for $i in xv:item/@ref return normalize-space($i)"/>
            <sch:assert test="count(distinct-values($all-item-refs)) eq count($all-item-refs)">
                Conflicting items must be uniquely defined for a given version
            </sch:assert>
        </sch:rule>
        <sch:rule context="xv:item">
            <sch:assert test="index-of($Nversions-id,@ref) gt 0">
                The reference to version "<sch:value-of select="@ref"/>" is dangling (no corresponding version found in the whole history)
            </sch:assert>
        </sch:rule>
    </sch:pattern>
</sch:schema>
```

What is claimed is:

1. A computer-implemented method for processing a markup language document, comprising:
   receiving a first version of a target document into computer memory;
   receiving a second version of the target document into computer memory;
   using a computer processor, encapsulating one of the first and second versions of the target document within an encapsulating document, the encapsulated document being represented in the encapsulating document as a tree of interconnected nodes encoding the entire one of the first and second versions of the document;
   encoding a change history corresponding to a difference between the first version and second version of the target document, wherein the change history contains a versioning point for each of a plurality of versions of the target document and a respective version identifier;
   wherein in the encoding of the change history, a diff engine compares the two versions of the target document and outputs the differences between the two versions in a change description language;
   and wherein at least one of the versioning points contains a version difference derived from the diff engine output;
   encapsulating the change history within the encapsulating document;
   providing for receiving a version identifier into computer memory corresponding to one of the versions encapsulated in the encapsulating document;
   applying version differences contained within the change history to the version of the target document within the encapsulating document such that, after the version differences are applied, the encapsulated version of the target document represents the versioning point corresponding to the received version identifier;
   re-encoding the versioning points, which are contained within the change history of the encapsulating document, relative to the focused target document; and
   outputting the encapsulating document.

2. The method of claim 1, wherein the target document and encapsulating document are encoded in XML.

3. The method of claim 1, wherein the outputting of the encapsulating document includes outputting the encapsulating document to at least one of:
   computer memory; and
   a visual display.

4. The method of claim 1, wherein the encapsulating document includes a link that relates the encapsulated version of the target document to one of a plurality of the versioning points in the change history.

5. The method of claim 4, wherein at least one versioning point contains a version difference that includes a forward link, and wherein at least one versioning point contains a version difference that includes a backward link.

6. The method of claim 4, wherein at least one versioning point contains a version difference that includes supplemental information; and
   wherein the supplemental information includes at least one of:
   user meta-information, a time, and
   optimization data.

7. The method of claim 1, wherein the encapsulation of a version of the target document is achieved without changing the content, tag, and
   attribute values contained in the version of the target document.

8. The method of claim 1, further comprising providing for an extraction operation comprising:
   parsing and extracting a version of the target document from within the encapsulating document; and
   outputting the extracted version of the target document.

9. The method of claim 1, further comprising providing for a merging operation for merging a first version and a second version of the target document comprising:
   providing the first and second versions of the target document to be merged to memory;
   merging the first and second versions of the target document to produce a third version of the target document;
   creating a versioning point within the encapsulating document corresponding to the third version of the target document; and
   outputting the encapsulating document.

10. The method of claim 9 wherein creating the versioning point within the encapsulating document corresponding to the third version of the target document further includes creating a first version difference and a second version difference, such that applying the first version difference to the first version of the target document produces the third version of the target document and applying the second version difference to the second version of the target document produces the third version of the target document.

11. The method of claim 1, wherein encapsulating the first or second version of the target document within a standalone encapsulating document includes the use of an inclusion link or external reference.

12. A computer program product comprising a non-transitory medium encoding instructions which, when executed by a computer, perform the method of claim 1.

13. A computer-based system for encoding a target document and its change history within an encapsulating document, comprising:
   a computer processor;
   computer memory which stores an encapsulation module and a focusing module;
   wherein the encapsulation module is configured to:
   receive a first version and a second version of a target document in computer memory;
   using the computer processor, encapsulate one of the first and
   second versions of the target document within an encapsulating document, the content of the one of the first and second versions being encapsulated without change to the tag or attribute values contained in the respective version of the target document;
   encode a change history corresponding to a difference between the first version and the second version of the target document;
   encapsulate the change history within the encapsulating document with a version identifier whereby a plurality of subsequent versions are encodable in the change history of the same encapsulated document with respective identifiers; and
   output the encapsulating document; and
   wherein the focusing module is configured to:
   receive a version identifier into computer memory;
   apply version differences contained within the change history to a first focused version of the target document such that, after the version differences are applied, the resulting second focused version of the target document represents the versioning point corresponding to the received version identifier;
   re-encode the versioning points contained within the change history relative to the second focused version of the target document; and
   output the re-encoded document.

14. The computer-based system of claim 13, wherein the target document and encapsulating document are encoded in XML.

15. The computer-based system of claim 13, further comprising an extraction module configured to:
   parse and extract a version of the target document from within the encapsulating document; and
   output the version of the target document.

16. The computer-based system of claim 13, further comprising a merging module configured to:
   provide a first version of the target document to memory;
   provide a second version of the target document to memory;
   merge the first and second versions of the target document to produce a third version of the target document;
   create a versioning point within the encapsulating document corresponding to each of the first, second, and third versions of the target document; and
   output the encapsulating document.

17. The merging module of claim 16 wherein the merging of the first and second versions of the target document results in the creation of a first version difference and a second version difference such that applying the first version difference to the first version results in the third version of the target document and applying the second version difference to the second target document also results in the third target document.

* * * * *